United States Patent [19]
Grant

[11] Patent Number: 5,662,245
[45] Date of Patent: Sep. 2, 1997

[54] CONTAINER WITH INTEGRALLY MOLDED CLOSURE/TAMPER INDICATOR

[75] Inventor: Chris J. Grant, Brentford, United Kingdom

[73] Assignee: Schmalbach-Lubeca AG, Manchester, Mich.

[21] Appl. No.: 454,303

[22] PCT Filed: Dec. 17, 1993

[86] PCT No.: PCT/US93/12340

§ 371 Date: Aug. 10, 1995

§ 102(e) Date: Aug. 10, 1995

[87] PCT Pub. No.: WO94/14696

PCT Pub. Date: Jul. 7, 1994

[30] Foreign Application Priority Data

Dec. 18, 1992 [GB] United Kingdom ............... 9226420
Feb. 9, 1993 [GB] United Kingdom ............... 9302497

[51] Int. Cl.⁶ .................................................. B67B 5/00
[52] U.S. Cl. ..................... 222/153.07; 222/153.14; 222/546; 222/556; 264/537; 220/254
[58] Field of Search ................ 222/153.06, 153.07, 222/153.14, 545, 546, 556; 215/1 C, 31, 32; 425/525; 264/523, 537

[56] References Cited

U.S. PATENT DOCUMENTS

| | | | |
|---|---|---|---|
| 3,086,249 | 4/1963 | Nelson et al. ............................ | 18/55 |
| 3,250,436 | 5/1966 | Kurtz ...................................... | 222/153 |
| 3,587,944 | 6/1971 | Pehr ....................................... | 222/480 |
| 4,132,225 | 1/1979 | Whattam ................................ | 128/2 F |
| 4,439,393 | 3/1984 | Saito et al. ............................. | 264/532 |
| 4,801,054 | 1/1989 | Nycz ...................................... | 222/545 |
| 4,923,723 | 5/1990 | Collette et al. ......................... | 428/35.7 |
| 5,008,066 | 4/1991 | Mueller .................................. | 264/537 |
| 5,038,454 | 8/1991 | Thornock et al. ...................... | 264/537 X |
| 5,051,227 | 9/1991 | Brun, Jr. et al. ........................ | 264/537 |

FOREIGN PATENT DOCUMENTS

| | | |
|---|---|---|
| 3033-243 | 2/1988 | Japan . |
| 2 246 317 | 1/1992 | United Kingdom . |
| 9200223 | 1/1992 | WIPO ................................... 222/556 |

*Primary Examiner*—Joseph Kaufman
*Attorney, Agent, or Firm*—Harness, Dickey & Pierce, P.L.C.

[57] ABSTRACT

An integrally molded plastic container including a container body and a closure. The closure includes an orifice cap and sealing cap. The orifice cap is flexibly hinged to the neck portion adjacent to the container opening for pivoting movement from an open position to a closed position where the orifice cap closes the opening. The sealing cap is also flexibly hinged to the neck portion adjacent to the opening for pivoting movement relative to the orifice cap between a closed position where the sealing cap is in sealing relation with an orifice in the orifice cap and an open position where the sealing cap is out of sealing relation with the orifice.

22 Claims, 20 Drawing Sheets

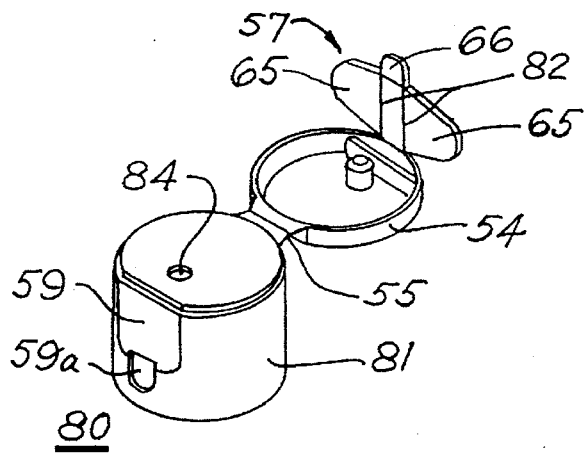
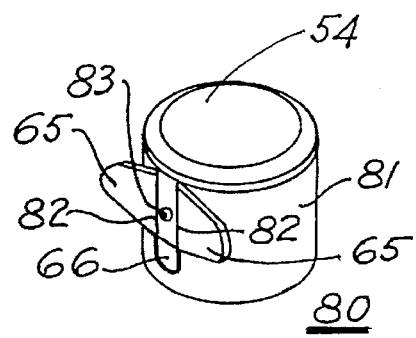
FIG. 23   FIG. 24
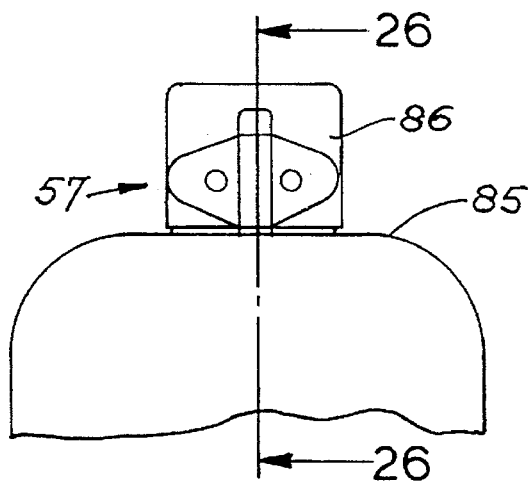
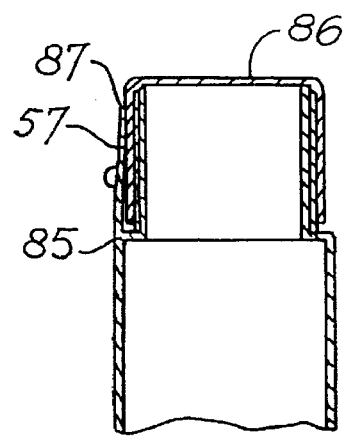
FIG. 25   FIG. 26
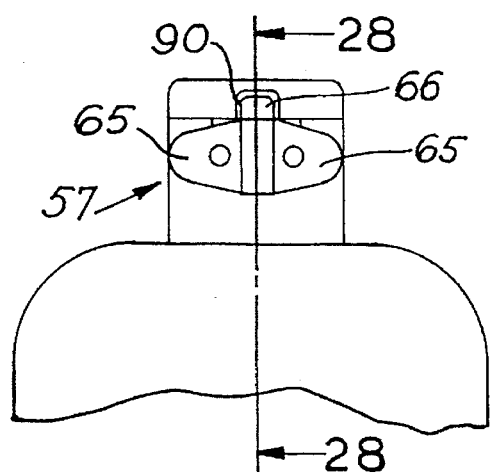
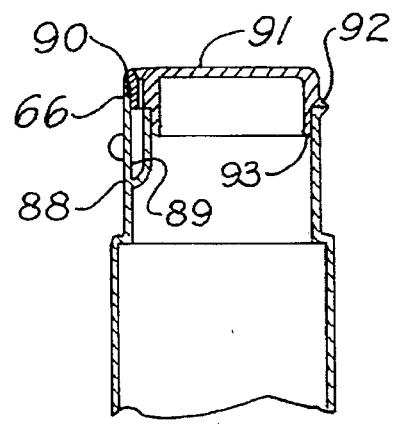
FIG. 27   FIG. 28

CONTAINER WITH INTEGRALLY MOLDED CLOSURE/TAMPER INDICATOR

BACKGROUND OF THE INVENTION

This invention relates to molded plastic containers, bottles, and the like having integrally molded multi-element closures, and to integral tamper indicating systems for such containers.

Plastic containers that are currently available require two separate components. The two main components of the container are the container body, which defines one or more compartments, and a cap or closure which is adapted for mounting on the container body for sealing the compartment or compartments. Typically, the container body has a restricted neck portion and accordingly is produced by an extrusion or injection blow molding operation. Manufacturing containers by extrusion blow molding generally offers the advantage that undercuts are easily formed. Extrusion blow molding has the disadvantage that no integral solid components can be formed concurrently, but hollow shapes such as a handle can be formed by the volume of the container. Therefore, presently the closure for the container is produced separately by an injection molding process and is assembled to the container body after the container has been first filled with the required contents. Injection blow molding offers the advantage of being able to form integral solid components, for example, a solid handle. An example of this is illustrated in French Patent no. 1,192,475 where an integral solid handle is formed as part of an injection blow molded bottle. However, each separate component requires its own set of tooling, manufacturing infrastructure and inventory control.

In many applications, the neck or container opening is too large to act as a restricting orifice. For such applications, a third or intermediate component that includes a small orifice or multiple orifices, is provided, to aid in the dispensing of flowable material. Pouring through a small restricting orifice aids in metering out of the contents and limits the amount of spillage if the container is tipped over. The intermediate or orifice component and closure are sometimes combined, forming a one-piece closure. One example of such a combination of closure/orifice is the dispensing closures used for example for shampoo bottles and the like.

Often, the components of the container are manufactured from plastic in separate operations in separate tooling in separate factories, after which assembly of the separate components is required, prior to the container being filled with the necessary contents. This requires transport costs and automated sorting and assembly of the closure to the body on the filling line. Consequently, this method of manufacture is characterized by compounded relatively high material, tooling and handling costs, as well as increased costs for assembly. Moreover, producing the body of the container and the container closure from different materials complicates recycling of the containers. Such container and closure packages would be more economically and environmentally friendly if they could be produced from the same material in one manufacturing operation in one factory.

A further consideration is that tamper indication is becoming more of a necessity than a luxury. As the cases of malicious tampering increase, the public need and expect to be protected. Tamper evident containers are now becoming a prerequisite of all types of substances, for example, foods, pharmaceuticals, toiletries and other domestic and industrial products.

Many methods of tamper evidence are employed. Most methods require separate tooling, additional manufacturing infrastructure, transportation, inventory control and automated assembly. Two common forms of tamper evidence include the use of a plastic sleeve that is shrunk onto the container, for example a jar of honey, and a plastic circumferential tear tab that is formed integrally with a pivotal or removable cap assembled, for example, a pill container. Some of the disadvantages of the sleeve concept are that separate tooling is required to manufacture the sleeve and that production machinery is required for assembly. In addition, the technology is easily within the grasp of an individual desiring to compromise the tamper evident system.

SUMMARY OF THE INVENTION

The present invention provides a one-piece, integrally molded container having a container body with one or more compartments and a double closure cap means which is pivotally hinged to the container body, closing the compartments. In one embodiment, the closure cap means includes a sealing or outer cap portion and an orifice or inner cap portion including an orifice which provides a restriction for metering the flow of material out of the container. The container neck defines a flat finger access area to facilitate reopening of the sealing cap and provide a flat edge for the orifice cap hinge. Typical uses of the integrally molded double cap container include the storage of toiletries and pharmaceuticals, as well as domestic and industrial applications, such the storage of shampoo, cleaners, or any practical liquid, solid, powder granular or flowable substance.

An important advantage of the integrally molded container provided by the present invention is that the entire container can be manufactured in one process, which in a preferred embodiment, is an injection blow molding process. In addition, the integral packaging system has inherent advantages including a savings of material, being very easy to recycle because the whole container is obviously made from one type of material, and providing the capability of reopening of the orifice cap for refilling purposes. Manufacturing a sealing cap and an orifice cap integral with the body using an injection blow molding or injection molding process in accordance with the present invention eliminates many of the problems associated with container production using prior art methods wherein containers are produced as two or three separate components and then assembled together. For example, because the sealing cap has a fixed orientation relative to the body of the container, the front of the cap will always face in the correct direction. That is, no angular misalignment is possible, such as is the case for existing screw or push on type closures. Additionally, this method avoids the need for the forming of a thread, one of the most difficult features of a bottle to make. Moreover, because the entire container is manufactured from one type of plastic, no separating out of the different plastic types is necessary prior to recycling. Furthermore, because there is minimal overlapping of the closure cap and the container body, there is a savings of material over the closing systems that are currently available. Another advantage is that the problem of color matching of the container and closure is eliminated.

The hinge for the orifice cap is almost fully concealed visually within the container closure so that it will not act as a dirt trap. In addition, the hinge for the orifice cap is relatively long which offers strength for handling purposes and stiffness against torsional rotation. This aids in alignment when the orifice cap is rotated from its open position to its closed position. Extra sealing and guidance is provided for the sealing cap by a sealing lip defined by the orifice cap. In accordance with a feature of the invention, the orifice cap is resealable, allowing the container to be easily refilled. The sealing cap is fully sealed by the addition of a sealing wall, so that container leakage will not occur.

Further in accordance with the invention, there is provided an integrally manufactured container having a body with one or more compartments and including for each compartment an integrally molded tamper indicating system, an integrally molded pivotally hinged cooperating orifice cap with an integrally molded pivotally hinged cooperating sealable sealing cap. The tamper indicating system includes an integrally molded tamper proof tear tab which is provided for security. The tear tab includes a free end portion which is adapted to be attached to the container body such as by ultrasonic welding after the container has been filled and closed. The tamper indicating system according to the present invention, eliminates many of the problems associated with tamper indicating systems currently available. Moreover, the tamper indicating system is easy to use and provides an obvious visual and physical indication of tampering at a comparatively low cost.

DESCRIPTION OF THE DRAWINGS

FIG. 23 is a perspective view of a closure for a container closure including an orifice cap a sealing cap and a tamper tab assembly, with the sealing cap shown in the open position;

FIG. 24 is a perspective view of the container closure shown in the closed condition;

FIG. 25 is a fragmentary front elevation view illustrating a closure mounted on a container wherein the tamper tab assembly is molded integrally with the shoulder of the container and is attached to the closure;

FIG. 26 is a section view taken along the line 26—26 of FIG. 25;

FIG. 27 is a fragmentary front elevation view illustrating a closure mounted on a container wherein the tamper tab assembly is molded integrally with the neck of the container below the closure and attached to the closure;

FIG. 28 is a section view taken along the line 28—28 of FIG. 27;

DESCRIPTION OF PREFERRED EMBODIMENTS

Figure 1:
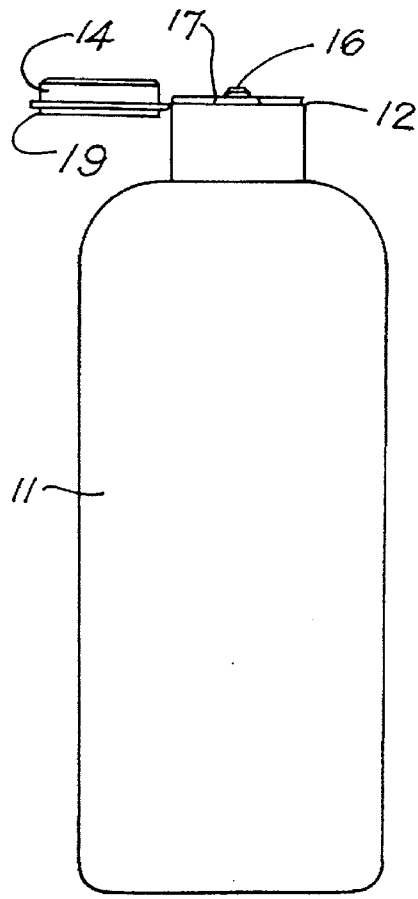
FIG. 1 is a front elevation view of an integrally molded, single compartment container in accordance with one embodiment of the invention, the container being shown in the open molded state.
Figure 3:
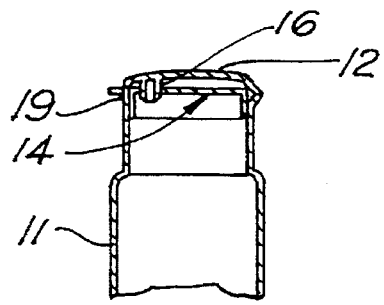
FIG. 3 is a fragmentary, vertical section view of the container showing the sealing cap closed.
Figure 2:
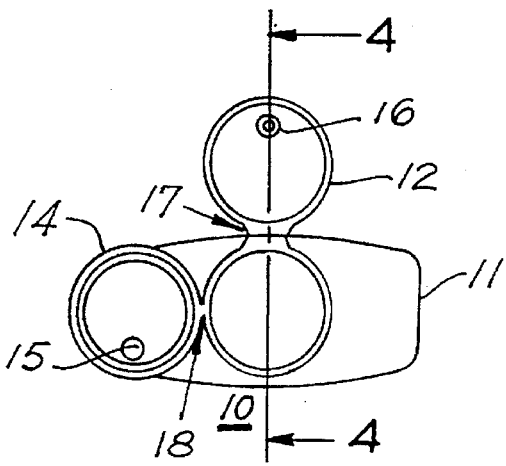
FIG. 2 is a top plan view of the container of FIG. 1.
Figure 4:
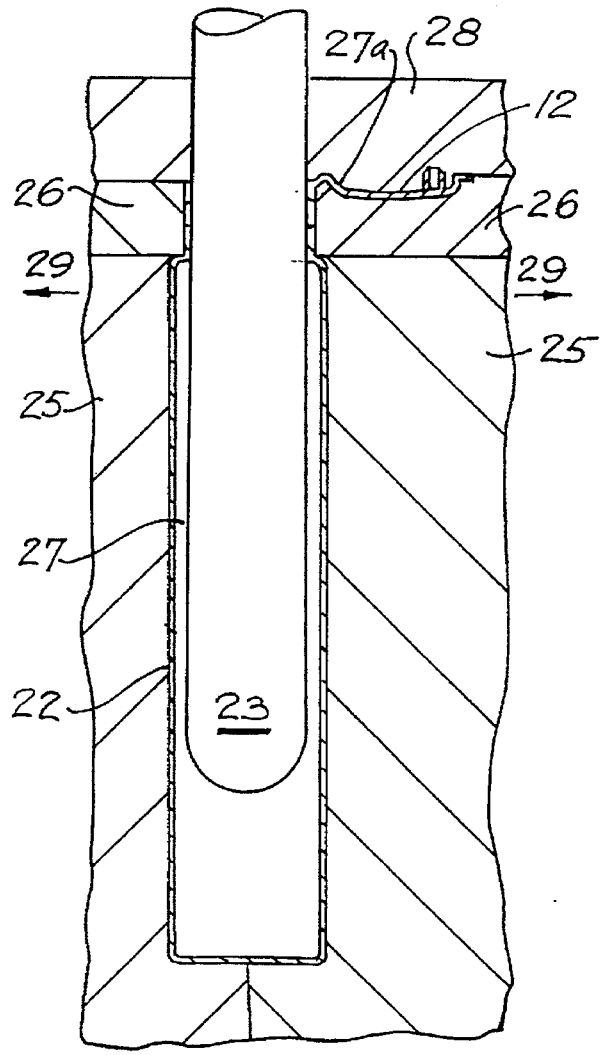
FIG. 4 is a vertical section view of the second stage of injection blow molding apparatus for producing the container.

Referring to FIGS. 1–4 of the drawings, there is shown a single compartment, injection blow molded integrally formed, double cap one-piece container 10 made of plastic. The container 10 has a body 11, a pivotal cooperating sealing cap 12, and a pivotal cooperating sealable orifice cap 14 which contains an orifice 15 which receives a mating boss 16 carried by the sealing cap 12 when the container is closed (FIG. 3). The orifice cap 14 is oriented 90° relative to the sealing cap 12 as is shown in FIG. 2. The container 10 is suitable for dispensing liquids, for example shampoo, and thus the need for an orifice 15 in the orifice cap and cooperating boss 16 on the sealing cap 12. The sealing cap 12 is pivotally hinged to the container body 11 by a hinge 17 which is located at the rear of the container body. The hinge 17 has its horizontal axis on a plane level with the bottom of the lip or flange 19 which receives the edge of the sealing cap 12 when the orifice cap is in a closed position as shown in FIG. 3. The orifice cap cannot be closed past horizontal due to the flange 19, that is, the sealing cap hinge is higher than the orifice cap hinge 18. The orifice cap is pivotally hinged to the body 11 by an integrally molded hinge 18. The hinge 18 for the orifice cap 14 need not be substantial in size, and thus can be less visually intrusive, because normally it will be pivoted only a few times.

To seal the container after the container body has been filled with the required contents, the orifice cap 14 is pivoted 180° about its hinge 18 to a closing position where it is seated in the neck of the container body. Then the sealing cap 12 is pivoted 180° about its hinge 17 to a closing position where it is seated in the orifice cap as is shown in FIG. 3. Many combinations of orientations of the sealing cap 12, the orifice cap 14 and body opening are possible. For example, the sealing cap 12 may be pivotally attached to the orifice cap 14 or to the body opening, the sealing cap 12 and the orifice cap 14 may be in line with each other, such as for container 50A as is illustrated in FIGS. 38–41. In a further alternative, the orifice cap 14 may be molded in a vertical position so that only 90° rotation is required to move it to its closed position, or the orifice cap hinge may be positioned adjacent or on the top of the sealing cap hinge. Any practical type of hinge can be used. The orifice cap 14 can contain one or more orifices arranged in any manner.

The container need not be manufactured with the orifice cap if a small restricting orifice is not required. A suitable seal between the integrally molded sealing cap and body opening will then be required, such as an extended lip on the cap which sealably cooperates with the inner surface of the neck of the body, as illustrated in FIG. 28, for example.

The container is produced, for example, using a multi-station injection blow molding apparatus, an injection stretch molding apparatus, an injection molding apparatus or any other suitable molding apparatus. In producing the integrally molded double cap container, first a parison is formed with the integrally molded sealing cap and the orifice cap, then transferred to the blow station where the final shape of the container body is formed. By way of illustration, the parison including any solid parts, such as the integrally molded sealing cap and the orifice cap, is formed by injection molding tooling (not shown) at a first injection molding station of an injection blow molding apparatus. Then, the parison and the integral solid components formed therewith are transferred as a unit along with the core rod 23 and a pair of mold plates 26 and 28 to a second station, which is the blow station of the injection blow molding apparatus, the tooling 20 for blowing the parison at the blow station being shown diagrammatically in section in FIG. 4. The tooling includes a two part mold 26 and a two part mold 25 which define a cavity 27 for blowing the parison to the final shape of the container, and cavity top plate 28 which together with the upper surface of mold 26 defines a cavity 27a for the injection molding of the sealing cap 12 and a further cavity (not shown) which defines a cavity for the injection molding of the orifice cap. At the blow station, the parison is blown to the final shape for the container body by air that is introduced into the cavity 27 through the core rod 23, in the manner known in the art, to conform to the shape of the cavity 27 defined by the mold plate 25 to produce the completed container 10. To simplify the drawing, the mold apparatus shown in FIG. 4 does not include tooling features known in the art, such as cooling channels, ejection points or the mold transport apparatus.

To remove the molded container 10 from the tooling 20, the top cavity plate 28 is elevated, allowing the sealing cap 12 and the orifice cap 14 to be released from their cooperating cavities in plate 26 by being ejected about their hinges. Then the mold plates 25 and 26 are moved outward in the direction indicated by the arrows 29. Then the integrally molded container 10 is ejected off the core rod 23. The container 10 may also be molded, filled and the sealing cap 12 and orifice cap 14 sealed in place by a single production machine.

Generally, it is advantageous for living or film hinges which are produced from plastic to be flexed while the item is still warm. This is achieved automatically in the tooling. The hinges, such as hinges 17 and 18 of container 10 are living or film type integrally molded hinges, but a three part or folding hinge or other hinge types also can be used.

Of course, the sealing cap 12 and orifice cap 14 need not be restricted to manufacture by injection blow molding, depending on the shape and configuration of the article being produced. Any suitable method is possible. For example, for a container where no large undercuts are required in the body, injection molding could be used for a container having straight sides with an integral sealing cap and an orifice cap.

Figure 5:
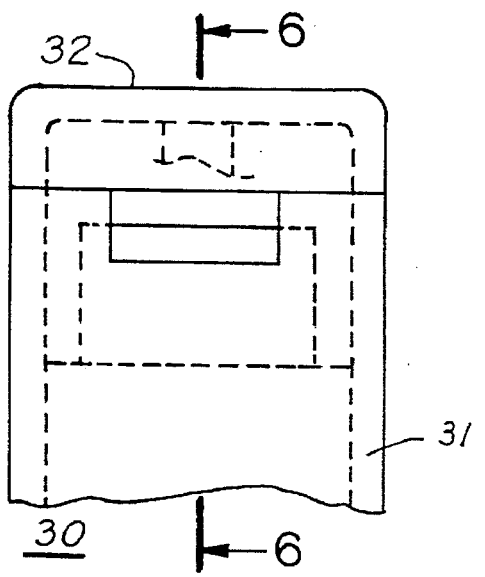
FIG. 5 is a front elevation view of the neck and closure of container in accordance with further embodiment of the invention with the orifice cap and the sealing cap in the closed position.
Figure 6:
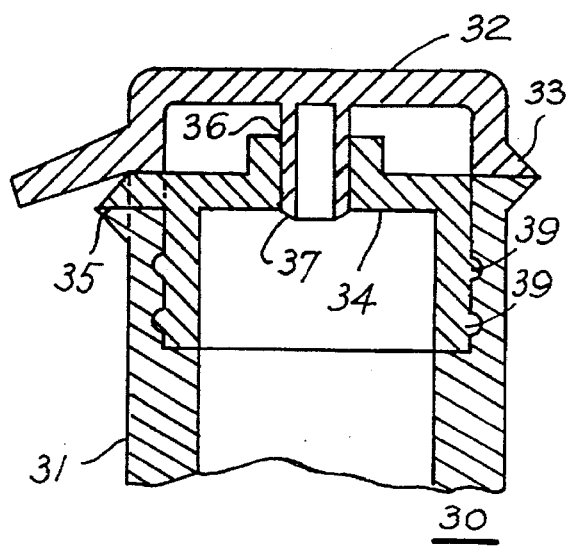
FIG. 6 is a side section view taken along the line 6—6 of FIG. 5.
Figure 7:
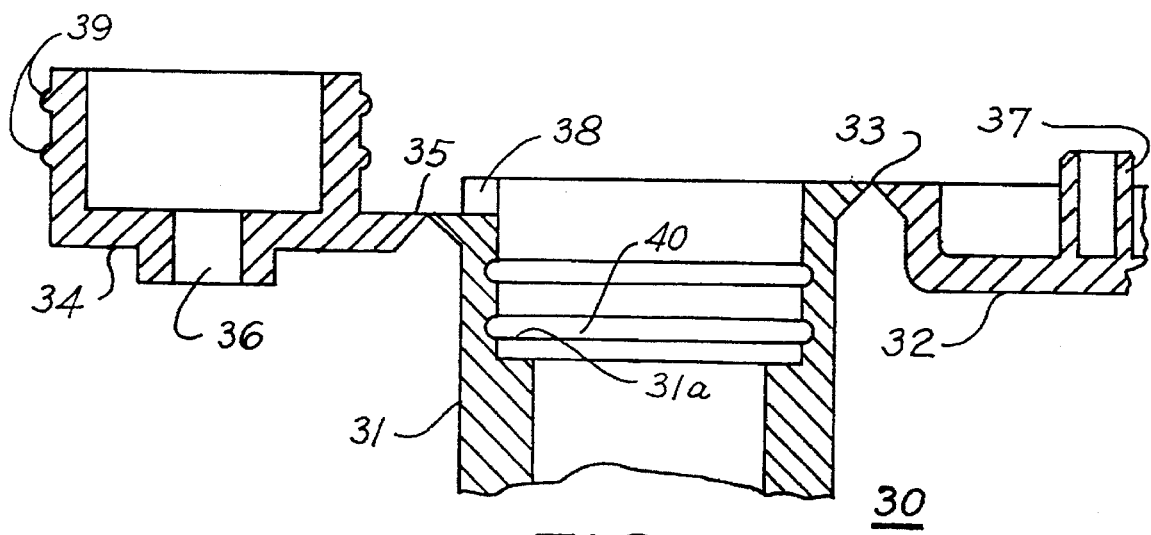
FIG. 7 is a view of similar to that of FIG. 6, but with the orifice cap and the sealing cap shown in the open position.

A further embodiment of an integrally molded plastic container 30 is shown in FIGS. 5–7. Referring to FIGS. 5–7, which are fragmentary section views of the upper portion of the container, the container 30 includes a container body 31, an outer or sealing cap 32 connected to the body by a living hinge 33 and an inner cap or orifice cap 34 connected to the body by a living hinge 35. The inner sealing cap 34 includes an orifice 36. The outer sealing cap 32 includes a boss 37 which is received in the orifice 36, plugging or sealing the orifice when the sealing cap is closed as shown in FIG. 7. The height orientation for hinge 33 is different from that for hinge 35. In the embodiment illustrated in FIGS. 5–7, the horizontal axis of hinge 33 is located higher than the horizontal axis of hinge 35. The advantage of such arrangement is that there is no interference between the orifice cap and the sealing cap as they are rotated to their respective closing positions. The neck of the container body includes a cutout 38 corresponding in length to the length of the hinge 35 so that the upper edge of the orifice cap is flush with the horizontal axis of the hinge 33. In addition, the outer surface of the orifice cap 34 includes one or more annular ribs 39 which are received in complementary annular grooves 40 in the inner surface of the container neck to lock the orifice cap in place in the neck of the container. The ribs 39 and grooves 40 provide snap together fit for the inner cap 34 and the neck of the container to aid in maintaining the inner cap 34 in a horizontal position and to prevent the inner cap 34 from opening under pressure. Also, the complementary ribs 39 and grooves 40 act as a labyrinth seal to prevent leakage of the contents of the container. The inner surface of the neck of the container defines an annular inwardly directed shoulder or step 131a to also prevent the inner cap from being closed beyond a horizontal position.

Figure 8:
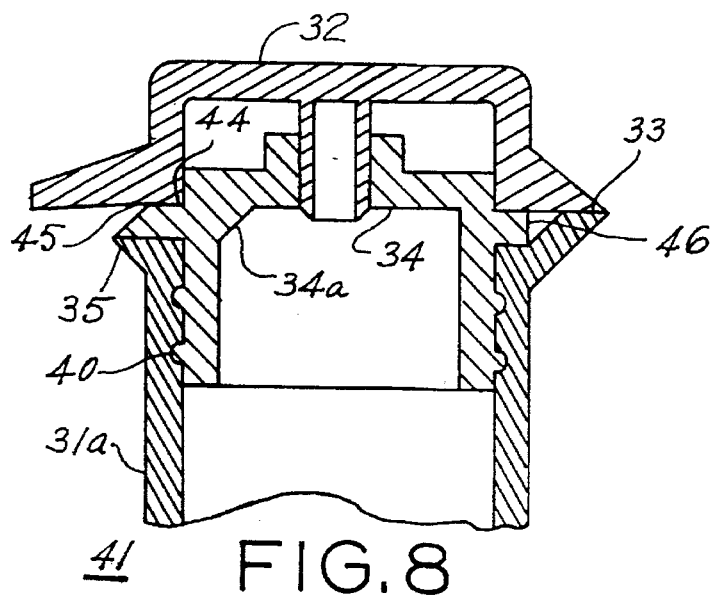
FIG. 8 is a side section view of the neck and closure of container in accordance with another embodiment of the invention, with the orifice cap and the sealing cap shown in the closed position.
Figure 10:
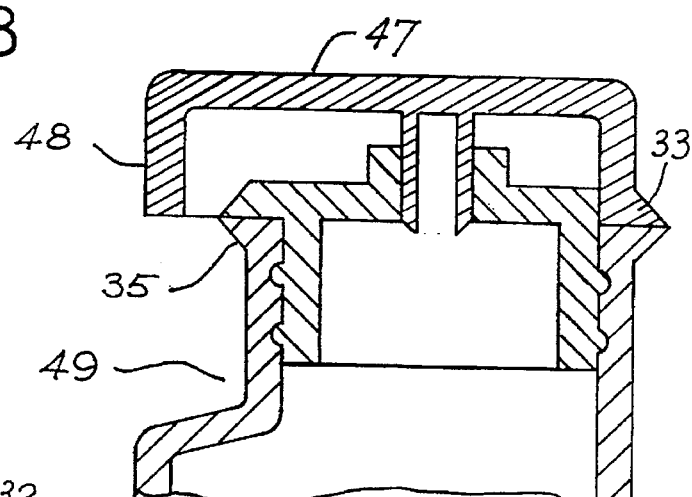
FIG. 10 is a view of similar to that of FIG. 8 for an alternative embodiment of the container neck and closure.
Figure 9:
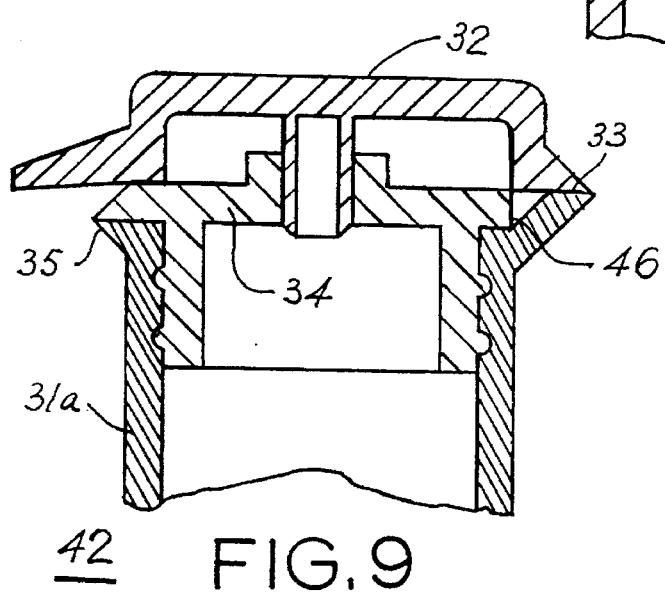
FIG. 9 is a view of similar to that of FIG. 8 for an alternative embodiment of the container neck and closure.

Referring to FIGS. 8–10, there are illustrated integrally molded plastic containers 41, 42 and 43. In the container 41 having body portion 31a, the orifice cap includes an annular shoulder 44 which extends around the outer edge of the orifice cap, defining a sealing edge for the sealing cap 32, the outer peripheral edge 45 of which is received on the shoulder 44. The orifice cap has a chamfer 34a and a peripheral flange 46 as per container 42. The horizontal axis of hinge 33 is located higher than the horizontal axis of hinge 35. Container 41 is similar to the container of FIG. 3, but has in-line caps and grooves 40 per container 30. Container 42 is like container 41 but without shoulder 44 and chamfer 34a. In the container 42, the orifice cap has a peripheral flange 46 which rests on the upper edge of the neck of the container, defining a resting surface for the container body 31. The horizontal axis of hinge 33 is located higher than the horizontal axis of hinge 35.

Figures 42, 43, 44, 45, 46:
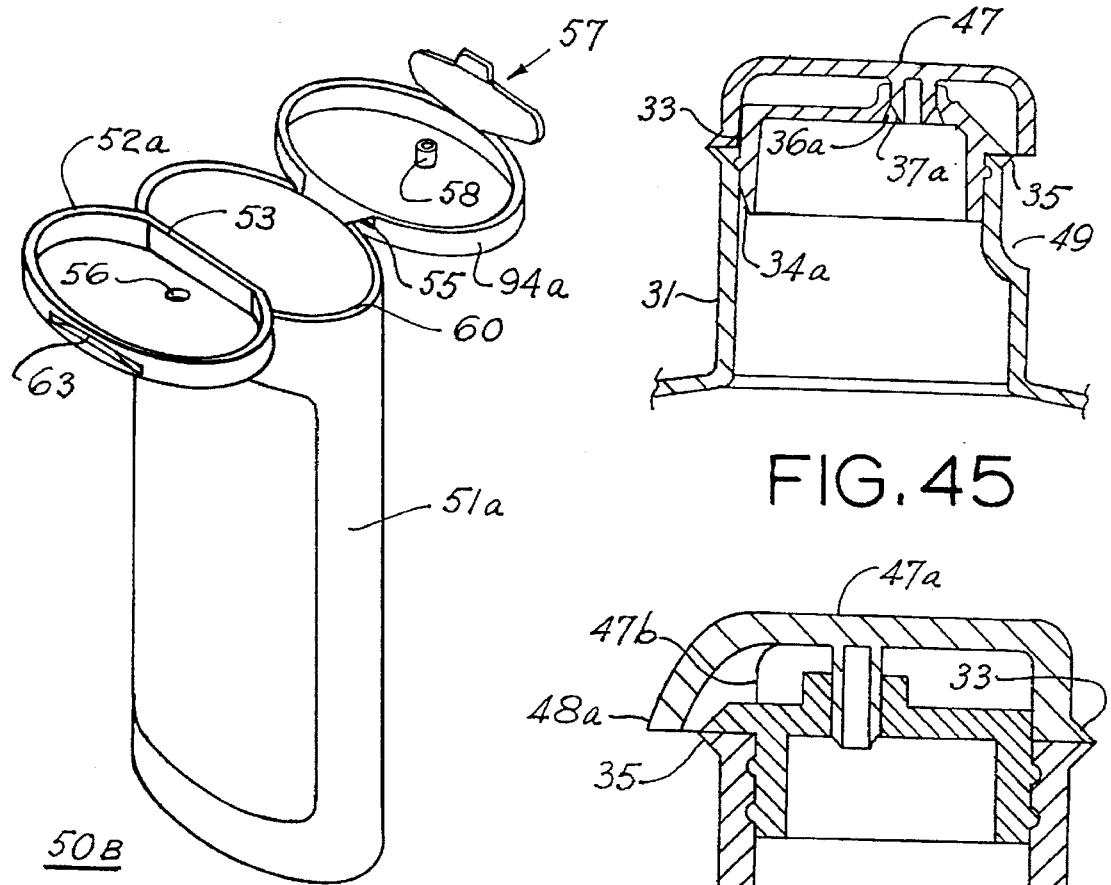
FIG. 42 is a perspective elevation view of an injection molded container having a tamper indicating assembly formed integrally with its closure.
FIG. 43 is a view similar to that of FIG. 8 for an alternative embodiment of the container neck and closure.
FIG. 44 is a top plan view of the container neck and closure of FIG. 43.
FIG. 45 is a view similar to that of FIGS. 10 and 20 showing details of the container orifice and sealing caps.
FIG. 46 is a fragmentary top of the container of FIG. 45 with the sealing caps in the open position, and also is a top plan view of the orifice cap and sealing cap of the container closure of FIG. 11.

Container 43, which is illustrated in FIG. 10, has a sealing cap 47 and a recessed, or necked in, flat finger scalloped area so that the hinge 35 is located within the boundaries of the circular sealing cap and spaced inwardly from the inside of the sealing cap, defining a flat finger access area 49. That is, there is no interference from the hinge 35 for the finger of an individual opening the container. In this embodiment, the hinges 33 and 35 are located at the same height. The hinge or pivot shown is that of a living or film type integrally molded hinge but a three part or folding hinge or other hinge type can also be used. Alternatively, the container may have a full round neck as shown in FIGS. 43 and 44 rather than the flat finger access area 49 (FIG. 10). In this embodiment, the front 48a of the sealing cap 47a protrudes from a location 47b to clear the orifice cap hinge 35. Referring to FIG. 45, in each of the embodiments illustrated in FIGS. 5–8 and 44 or other embodiments, the lower edge of the orifice cap may include a chamfer 34a and the respective lower edges 36a and 37a of the orifice and the boss may be tapered for ease of closing.

Referring to FIGS. 11–20 and 22, there is illustrated an integrally molded double cap plastic container 50 which includes a container body 51 with a cooperating orifice cap 52 and a cooperating sealable sealing cap 54. FIG. 21 illustrates a similar container neck with an integrally molded closure, but without an orifice cap. The orifice cap 52 is pivotally hinged to the container body by a hinge 53 that is integral with orifice cap 52. The orifice cap 52 includes an orifice 56. The sealing cap 54 is pivotally hinged to the container by a hinge 55 that is integral with the sealing cap 54. The hinges 53 and 55 of the respective orifice and sealing caps are shown in detail in FIG. 46. In this view, the container neck includes the sealing ring or rings 40 and the orifice cap includes the annular bead or lip 39 of the embodiments of FIGS. 5–10.

The sealing cap 54 includes an integral tear tab assembly 57. The sealing cap 54 also includes a boss 58 which plugs the orifice 56 when the sealing cap 54 is in its sealing condition. A scalloped finger access area 59 provides a straight edge for the orifice cap hinge within the confines of the sealing cap and to give better access to aid in the opening of the sealing cap 54. The orifice bearing cap 52 is hinged on the flat top edge or finish portion 60 of the container opening overlying the finger access area 59. When the orifice cap 52 is closed, the resulting sealing lip 61 (FIG. 14) between the tip of the orifice cap and the edge of the body opening provides guidance and sealing for the sealing cap. An extra sealing wall 62 is provided in the sealing cap for total sealing. A notch or recess 63, shown in FIG. 17, in the side of the orifice cap opposite to the hinge 53 is formed to receive the tip of a tool, the edge of a coin or the tip of a fingernail to aid in the reopening of the orifice cap to permit the container to be refilled. Alternatively, a tab could be provided on the orifice cap to facilitate opening of the orifice cap for refilling of the container. Such tab may protrude into the space of the sealing cap in which case a pocket (not shown) for clearance can be provided in the sealing cap. The hinges for the two caps are positioned opposite each other, but any other angular or height orientation is possible. The hinge or pivot shown is that of a living or film type integrally molded hinge but a three part or folding hinge or other hinge type can also be used.

The tear tab assembly 57 is molded integrally on the bottom edge 64 of the sealing cap and includes a pair of tear tab flaps 65. The free end 66 of the tear tab assembly 57 is defined by a narrow plastic extension which is received in a recessed portion 59a of the lower neck area 59. The free end 66 is secured to the body of the container in recess 59a permanently by ultrasonic welding after the container has been filled and the two caps have been rotated to their closed positions. The free end 66 may be secured to the container by other means of attachment, provided that such attachment results in two top and bottom necked areas which serve as upper tear point 67 and a lower tear point 68, respectively. Alternatively, one tear point is possible, this giving the advantage that no material is removed from the container and wasted.

Figure 11:
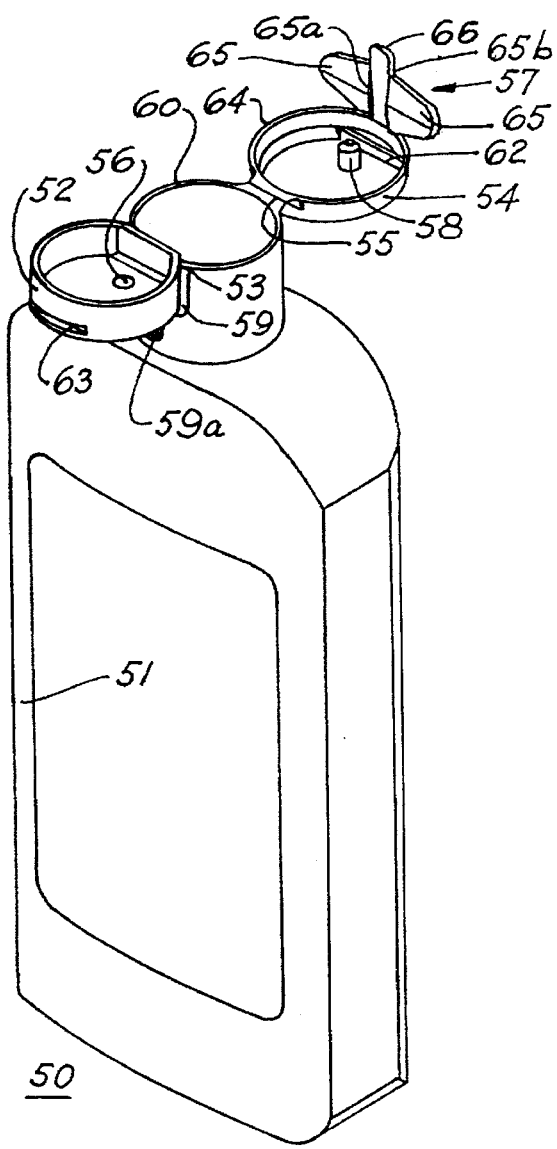
FIG. 11 is a perspective view of a single compartment container having an integrally molded sealing cap, orifice cap and tamper tab assembly in accordance with one embodiment of the invention, the container being shown in the open molded condition.
Figure 17:
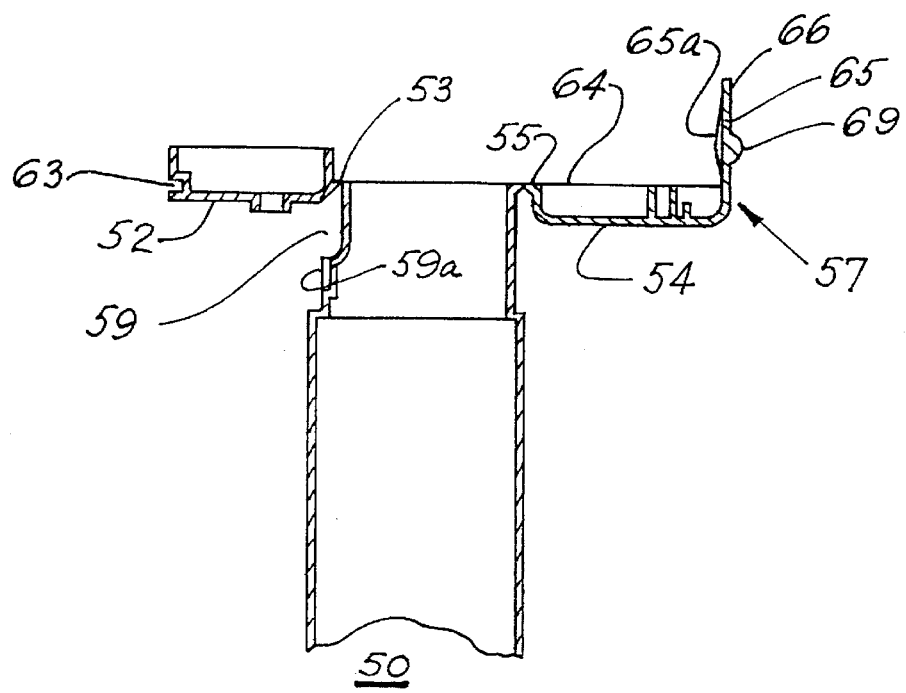
FIG. 17 is a section view taken along the lines 17—17 of FIG. 15.
Figure 18:
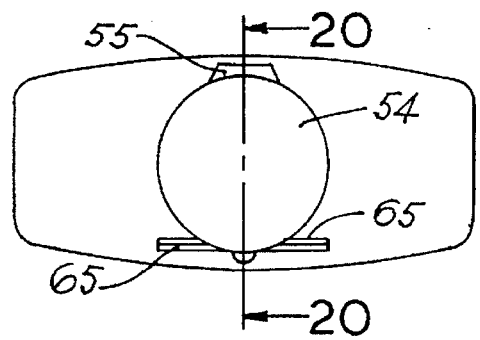
FIG. 18 is a top plan view of the container, with the container being shown in the closed condition.

Referring to FIGS. 11 and 17, the tabs 65 are generally triangular in cross section with the apex 65a facing inwardly to provide rigidity. The tear tabs are separated by a flat section 65b extending the width of the tear strip. Alternatively, the tear tabs may be triangular in cross section but without a flat in the center. In the latter case, to remove a sealed tear tab, the tab portion which is not being gripped will rotate around the neck of the container, acting as a wedge for providing leverage, the mechanical advantage thus provided making removal of the tear strip easier. The elements of the tear tab assembly, including the tear points and extension 66 but excluding the flats 65, are radiused in keeping with the circular shape of the cap and the container body. This adds stiffness to the tear tab assembly and aides in assembly.

For a container where no large undercuts are required in the body, injection molding could be used for a container having straight sides with a sealing cap and an orifice cap, such as container 50B illustrated in FIG. 42, where like elements have reference numerals corresponding to elements of container 50.

Referring to FIG. 17, to close the container 50, the orifice cap 52 is rotated 180° about its hinge 53 where it is received in the opening of the container. Then, the sealing cap 54 is rotated 180° about its hinge 55 to locate the free end 66 adjacent to the finger access area 59. Then, the free end 66 of the tear tab assembly is secured to the container by ultrasonic welding to provide the closed container illustrated in FIGS. 12 and 18–20, for example.

Figure 12:
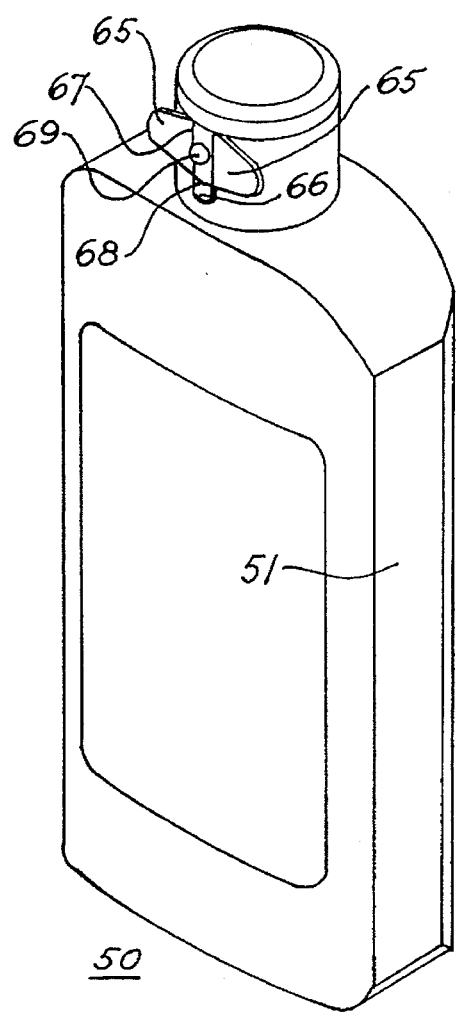
FIG. 12 is a perspective view of the container of FIG. 10, shown in the sealed condition.
Figure 13:
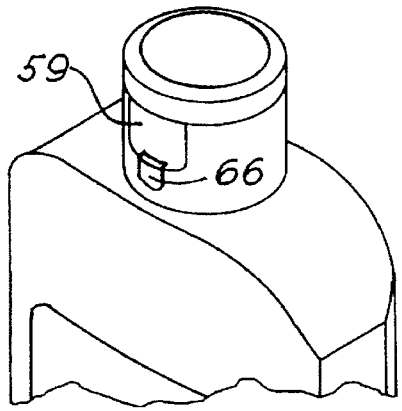
FIG. 13 is a fragmentary perspective view of the container of FIG. 10 with the tear tab removed.
Figure 14:
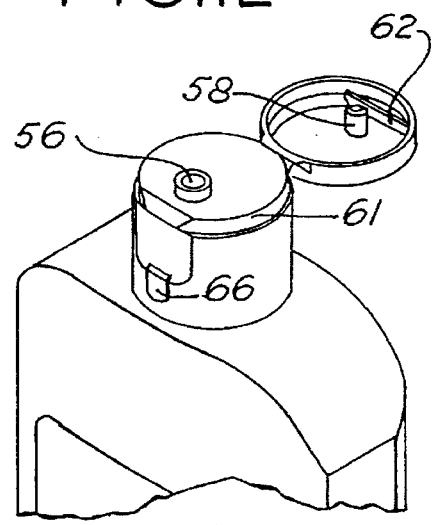
FIG. 14 is a fragmentary, perspective view of the container showing the sealing cap open and the free end of the tear tab secured to the container.
Figure 19:
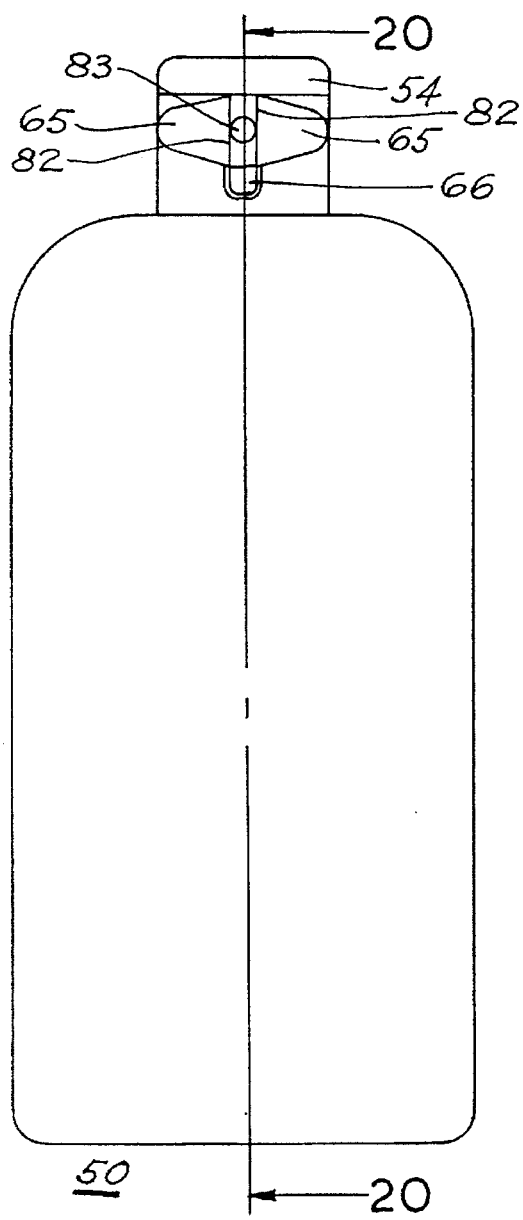
FIG. 19 is a front elevation view of the container shown in the closed condition.
Figure 20:
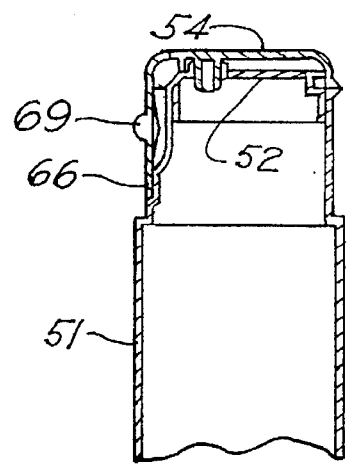
FIG. 20 is a section view taken along the lines 20—20 of FIG. 18.
Figure 21:
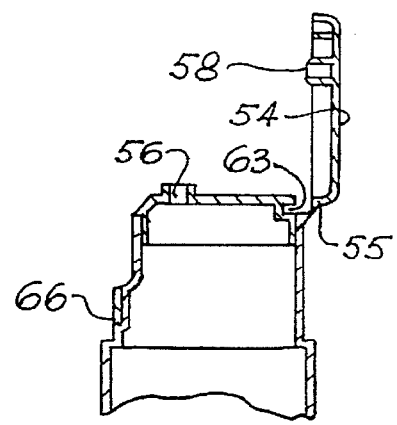
FIG. 21 is view similar to that of FIG. 20 but with the tamper tabs removed and the sealing closure open.
Figure 22:
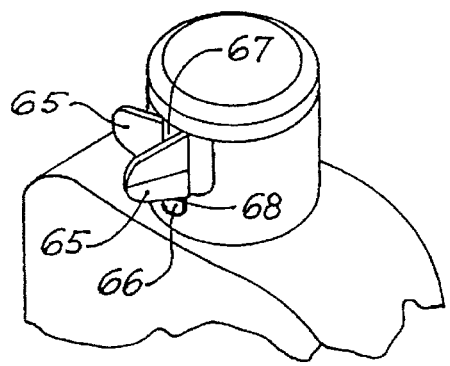
FIG. 22 is a perspective view of the container showing the tear tab flap being rotated during the removal of the tear tab.

Referring to FIGS. 20–22, after the container has been filled, sealed and then secured by attachment of the tamper tab to the container, access to the interior of the container is achieved by removing the material of the tear tab flaps 65 between the upper tear point 67 and the lower tear point 68. As is illustrated in FIG. 22, the tear tab flaps are removed by rotating one of the tear tab flaps about a vertical axis extending through the upper and lower tear points 67 and 68. The tear tab flaps are symmetrical left and right longitudinal sections which are suitable for gripping by finger action so that tearing of the plastic can be achieved by either a left or right opening operation. To reduce the tearing force on opening the tear tab, a wedge action is provided by a projection or boss 69. The tear tab 65 in this embodiment has two hinged areas 82. When either one of the tear tab flaps is rotated about the tab hinge area 82 so that the tear tab is forced against the boss, the boss acts as a wedge which aids in the initial tearing of the plastic material of the tear tab 65, so that the tamper strip can completely removed as shown in FIG. 13. To further reduce the initial tear force required, one of the tear points can be positioned ahead of the other tear point. When the longitudinal sections have been removed, the sealing cap 54 is free to be pivoted about its hinge 55 to the open position illustrated in FIGS. 14 and 21, for example. The presence of the longitudinal sections of the tamper tab as shown in FIGS. 12 and 19, for example, is indicative that the container has not been opened or tampered with subsequent to the container being filled, closed and sealed by the manufacturer of the product contained in the container.

Referring to FIGS. 23 and 24, the same tear tab concept can be applied to other closures, for example, standard screw on type, or push on caps or dispensing type closures 80, such as the type of closures used on shampoo bottles. The closure 80 includes a cap body portion 81, having an orifice 84 and a sealing cap 54 which is molded integrally with the cap body and are connected to the cap body by a hinge 55. As for the container 50 (FIG. 11), the free end 66 of the tear tab assembly 57 is secured to the body, which in this case is the cap body portion 81. Alternatively, the free end 66 may be extended in length and secured to the body of a container with which the cap is used. The tear tab 65 in this embodiment has two hinged areas 82 and a boss 83. When either one of the tear tab flaps is rotated about the tab hinge area 82 so that the tear tab is forced against the boss, the boss 83 acts as a wedge which aids in the initial tearing of the plastic material of the tear tab 65. Alternately, an opposite approach could be made where the tear tab could be integrally molded in the body of the container itself and the free end secured by ultrasonic welding or other means to the sealing cap, lid or top. Such arrangement is especially suited for screw on type closures where rotation of the closure would be hindered if an integral tear tab were present on the lower edge of the closure itself.

Referring to FIGS. 25–28, the integrally molded tear tab assembly 57 need not be molded concurrently with the container, but rather may be injection molded to the container body after the container body has been blown but before the container body is removed from the mold cavity. The container body can be injection molded or extrusion blow molded, for example. FIGS. 25 and 26 show the integrally molded tear tab assembly 57 extending up from the section 85 of the body below a screw cap 86 and secured to the cap 86 at 87 by ultrasonic welding, for example. In FIGS. 27 and 28, the tear tab is shown extending up from the lower intersection 88 to the finger access area 89, and the tear tab securing point 90 is recessed in the sealing cap 91 which is hinged to the neck of the container by hinge 92 as is shown in FIG. 28. The sealing cap shown in FIG. 28 has extended flanges 93 but which does not have an orifice component, such as an orifice cap. The tear tab concepts described can be applied to any application where the securing of two parts is required.

Figure 29:
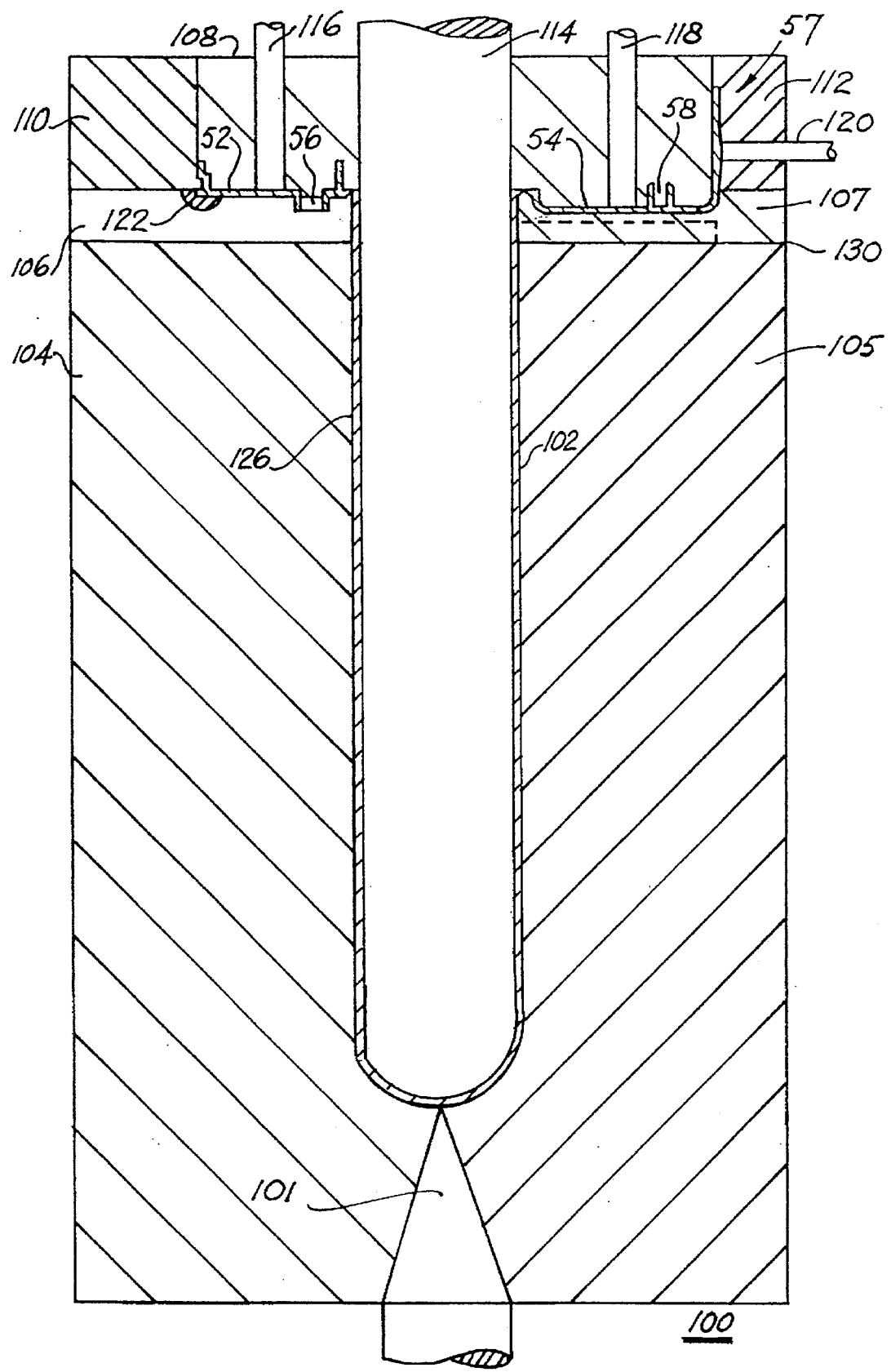
FIG. 29 is a diagrammatic side elevation view, in section, of the tooling used in a first stage of manufacture of the container of FIGS. 11–22.
Figure 30:
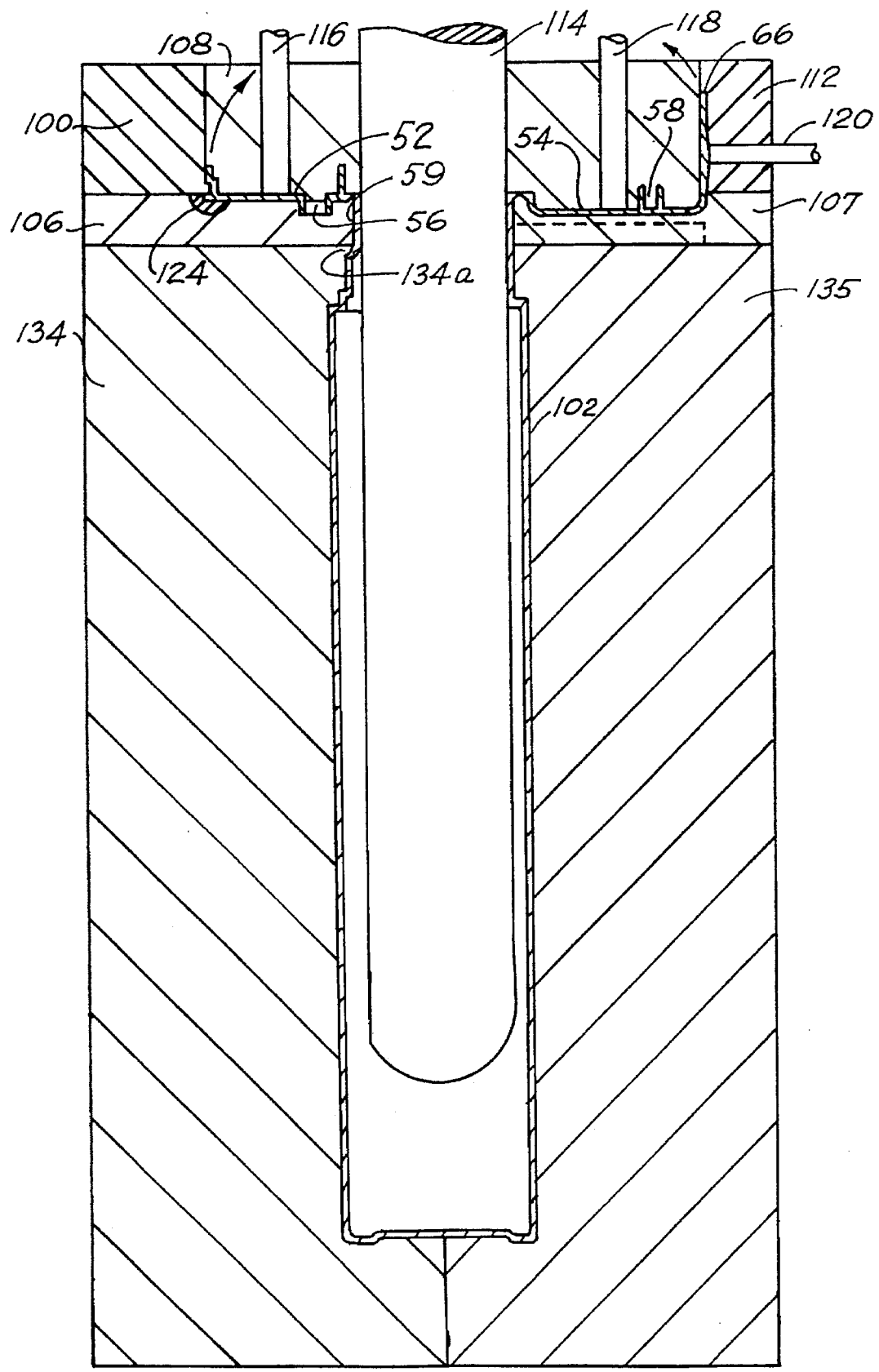
FIG. 30 is a diagrammatic side elevation view, in section, of the tooling used in a second stage of manufacture of the container of FIGS. 11–22.

Referring to FIGS. 29 and 30, there is shown, diagrammatically, tooling for the manufacturing process which provides the integral manufacture of the container 50 shown in FIG. 11, for example. The container is produced in a multistage process first forming a preform or parison from which the container body 51 is blown in a blow molding apparatus, the preform being formed in an injection molding apparatus with the orifice cap 52, the sealing cap 54, the tear tab assembly 57 and any other items or features that are required. Referring to FIG. 29, the tooling 100 for the first stage of the production cycle that provides for the injection molding through the injection nozzle 101 of an integrally molded preform or parison 102 from which the body 51 (FIG. 11) of the finished container is blown, the parison including the integrally molded orifice cap 52, the sealing cap 54, and the tear tab assembly 57 in the embodiment illustrated. The mold cavity arrangement of the tooling 100 includes a split lower left hand preform cavity defining tool 104 and a split lower right hand preform cavity defining tool 105. In addition, the tooling 100 includes a left lower cap cavity defining tool 106, a right lower cap cavity defining tool 107 and an upper cap cavity defining tool 108. The left lower cap cavity defining tool 106 provides a cavity for producing the lower surface of the orifice cap 52. The right lower cap cavity defining tool 107 provides a cavity for producing the lower surface of the sealing cap 54. The upper cap cavity defining tool 108 provides a cavity for producing the upper surfaces of the orifice cap 52 and the sealing cap 54, including the orifice 56 and the boss 58. The tooling 100 further includes an orifice cap recess side core cavity defining tool 110 which provides a projection for producing the recess 63 of the orifice cap 52 and a tear tab assembly side core cavity defining tool 112 which provides a cavity for producing the tear tab assembly 57. The core cavity tool 110 locates the recess 63 on the orifice cap in a position above or at least partially above the container neck, as shown in FIG. 20, for example, to provide access to the slot when the orifice cap is closed. A core rod 114, which is the core for the preform, acts as the passageway for the flow of air and bottle contents. The core rod 114 passes through the top cavity tool 108 and the left and right hand bottom cap cavity tools 106 and 107. The tooling 100 further includes an orifice cap ejection pin 116, a sealing cap ejection pin 118, a tear tab assembly ejection pin 120, an orifice cap rotating ejector bar 122. A sealing cap rotating ejector bar (not shown) acts on both sides under the tear tab assembly 57. Both sides of the rotating ejector bars pass through to the outside of the tool where they are attached to a rotating mechanism (not shown). Alternatively, the orifice cap could be an integral flat section and be molded in a vertical position.

Figure 15:
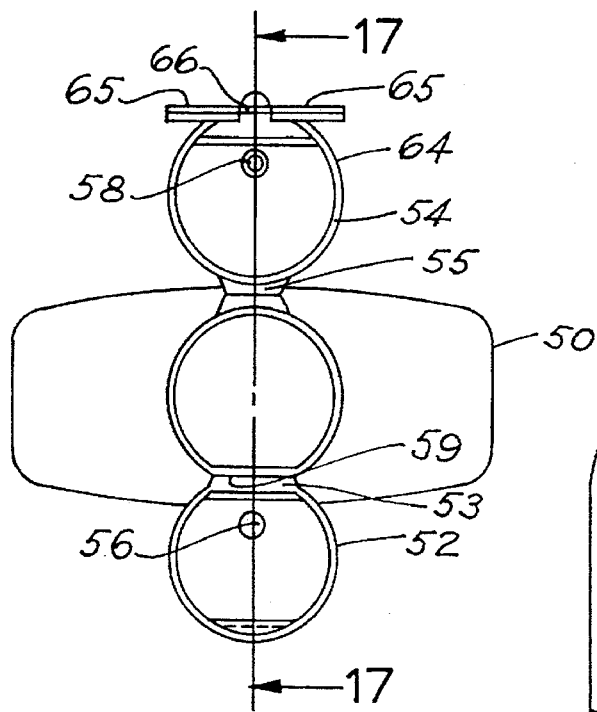
FIG. 15 is a top plan view of the container with the container being shown in the open molded condition.
Figure 16:
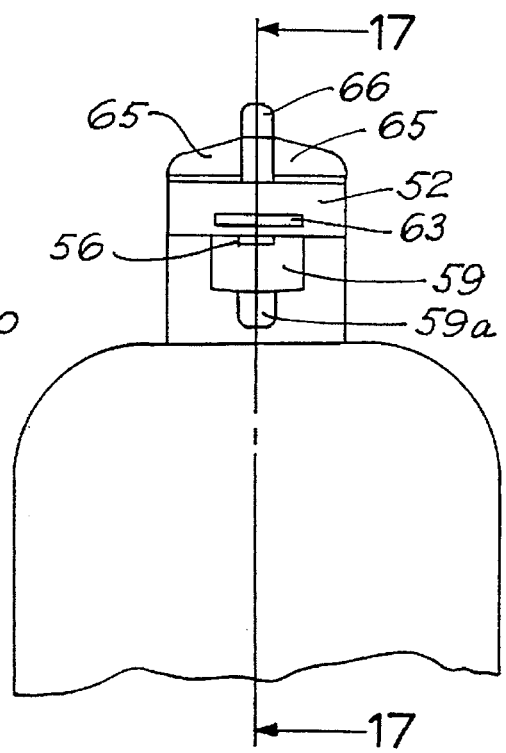
FIG. 16 is a fragmentary front elevation view of the container.

As shown in FIG. 29, the shape of the preform 102 in cross section is not fully circular. Rather, the preform has a flat 126 that runs its entire length so as to provide the flat surface that will define the finger access area 59 of the finished container. Thus, the mouth or opening of the container is generally D-shaped as is shown in FIG. 15. An alternative to this is to provide a flat only in the area required for finger access, in which case, a side core is provided in the core rod 114 and a full circular section is formed below the finger access area.

The split 130 between the preform cavity defining tools 104 and 105 and the bottom surface of the lower cap cavity tools 106 and 107 is above the area where stretching of the plastic takes place when the preform is blown. This ensures that a large visible line will not be present on the finished container body.

Referring additionally to FIG. 30, in the second stage of the manufacturing process, which is the blow stage, the split two-part lower preform cavity tools 104 and 105 are opened and replaced by further split two-part lower preform cavity tools 134 and 135, the neck portion of the preform being held by the left lower cap cavity defining tool 106, the right lower cap cavity defining tool 107 the upper cap cavity defining tool 108, the orifice cap recess side core cavity defining tool 110 and a tear tab assembly side core cavity defining tool 112. Compressed air is passed down the core rod 114 to expand the container body defining portion of the plastic preform 102 outwardly against the inner surface of the tooling to the shape of the mold cavity, forming the finished shape for the container, including forming a lower radius by a portion 134a of the mold to complete the formation of the flat finger access area 59. Alternatively, the radius could be molded in when forming the preform but this has the disadvantage of having a locally increased wall section. The core rod is then withdrawn to a position above the container opening and the container is then filled with the required contents through the core rod. The top cap cavity tool 108 is withdrawn. The ejector pins 116 and 118 are then withdrawn. The ejector pins may not be necessary if the tear tab and the recess in the orifice cap 110 are present. The orifice cap recess side core cavity tool 110 is withdrawn. The tear tab assembly side core cavity tool 112 is withdrawn. The tear tab assembly ejector pin 120 is withdrawn. The orifice cap 52 is closed by rotating its associated ejector bar. The left hand side of both the lower cap cavity tool 106 and the bottle cavity mold tool 104 are opened together. The sealing cap 54 is closed by the sealing cap rotating ejector bar (not shown). The finished container is then removed from the mold cavity by a robotic type grip head or ejected directly out of the cavity by ejector pins (not shown) in the mold cavity. Finally, the free end 66 of the tamper tab assembly is ultrasonically welded in place.

Figure 31:
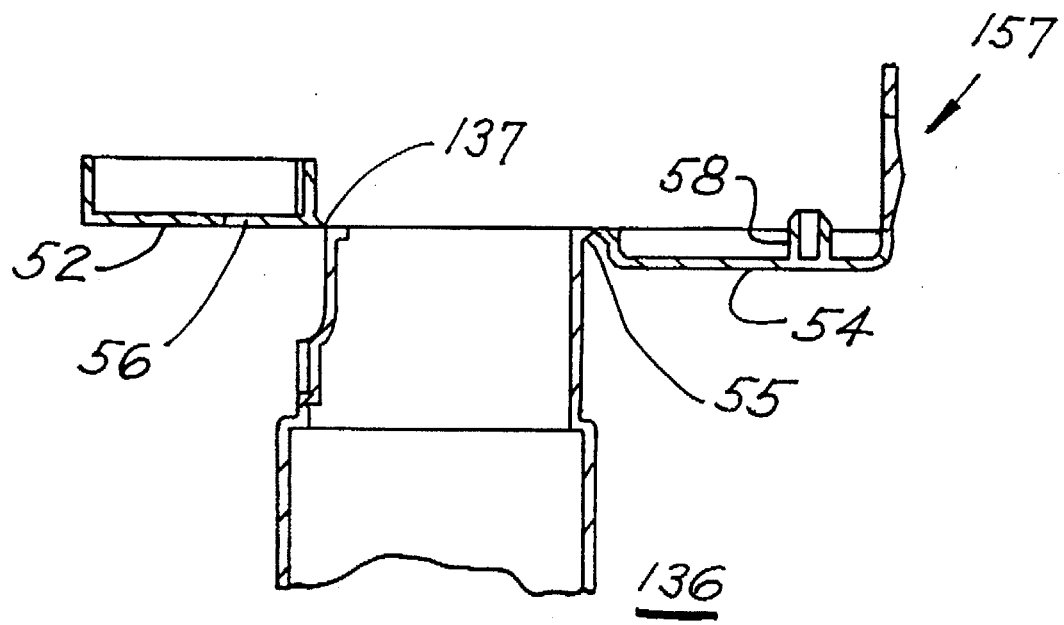
FIG. 31 is a vertical section view of the neck and closure of an alternative embodiment of the integrally molded container of FIGS. 11–22.
Figure 32:
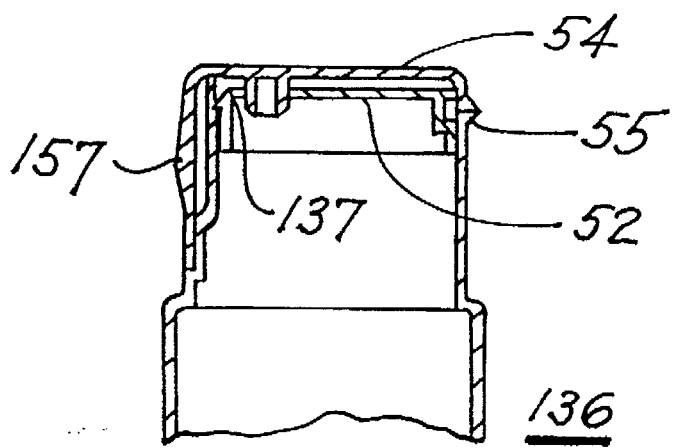
FIG. 32 is a view similar to FIG. 31, but showing the closure in the closed condition.

The container need not be filled and sealed in the above process, but may be operated on down stream where the filling and full closing of the caps and the labelling is carried out. If the container is not filled in the cavity (which aids the cooling of the plastic), preferably, the orifice cap is rotated a minimum of 45° about its hinge before the left hand lower cap cavity tool 104 (FIG. 29) is opened because an undercut is present. Alternately, with reference to FIGS. 31–32, container 136 includes a hinge 137 for the orifice cap 52 that is modified to eliminate the undercut so that rotation of the orifice cap 52 is not necessary before opening of the left hand mold cavity tools. The sealing cap 54 of the container 136 must be rotated a minimum of 45° by the sealing cap rotary ejector bars, prior to the container being ejected from the mold 104 and 105, but it is advantageous to rotate the sealing caps after molding because this aids hinge strength.

Figure 33:
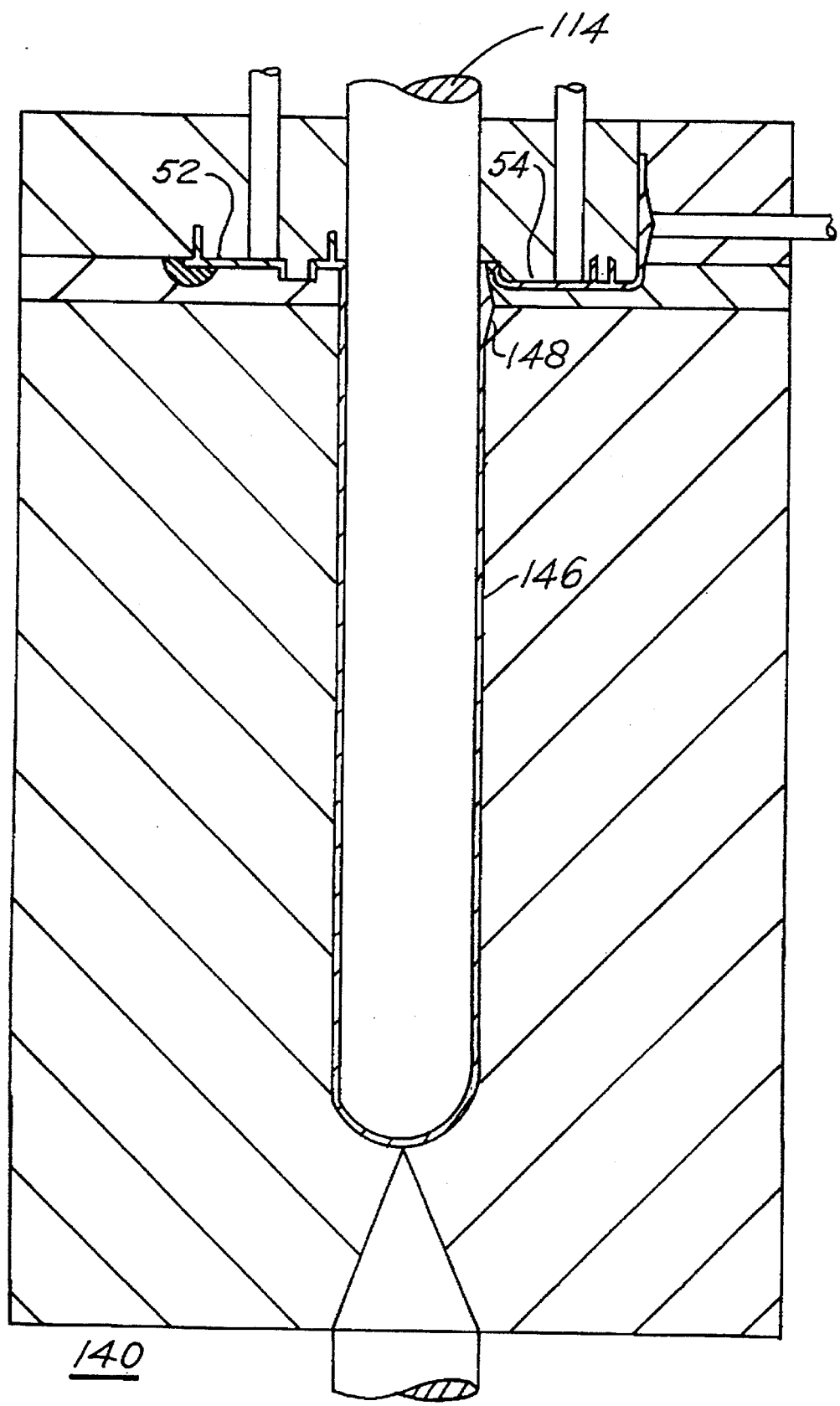
FIG. 33 is a diagrammatic side elevation view, in section, of an embodiment for tooling used in the first stage of manufacture of a smooth shaped integrally molded plastic restricted neck container.
Figure 34:
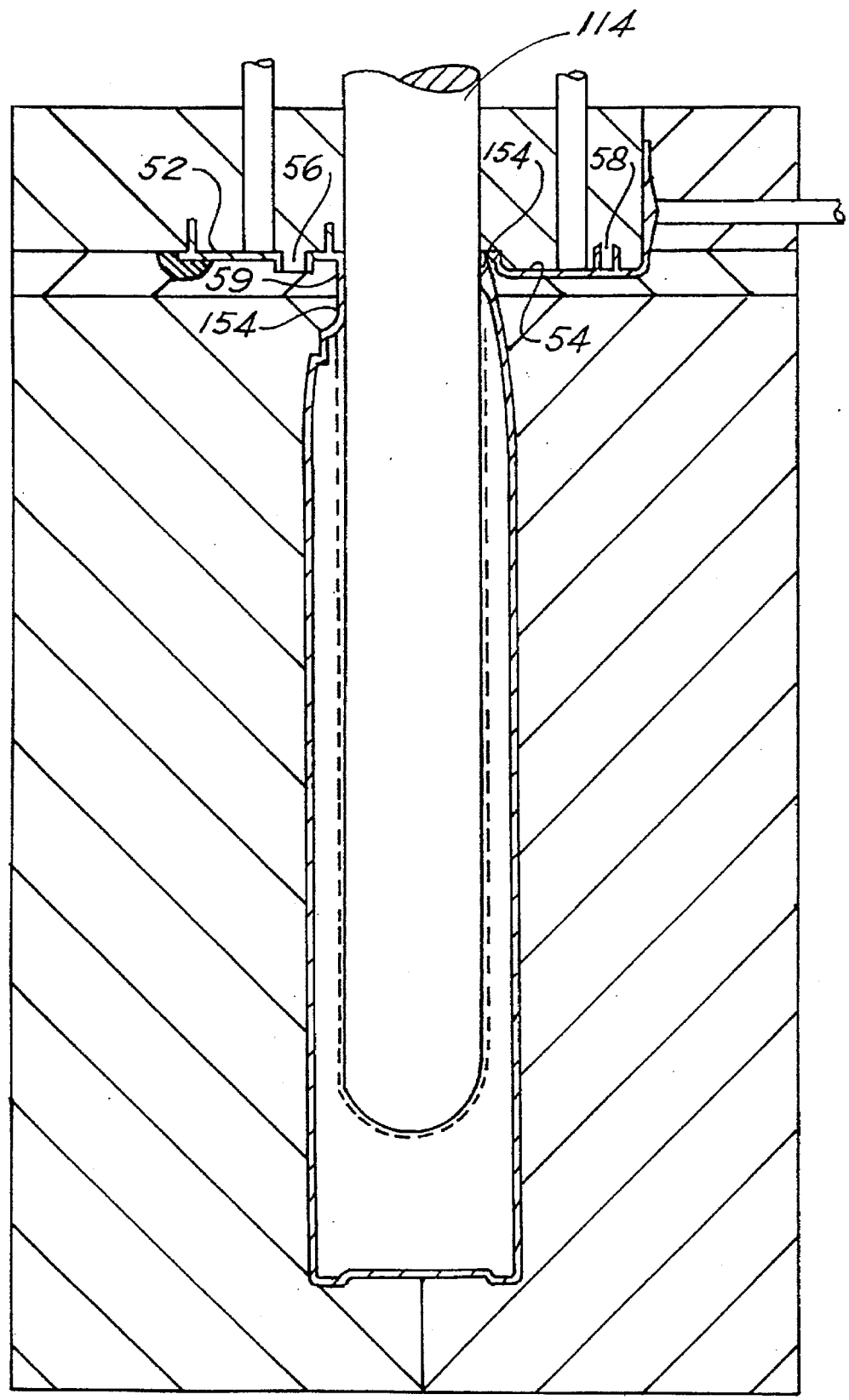
FIG. 34 is a diagrammatic side view, in section, of the tooling used in the second stage of manufacture of the smooth shaped integrally molded plastic restricted neck container shown in FIG. 33.
Figure 35:
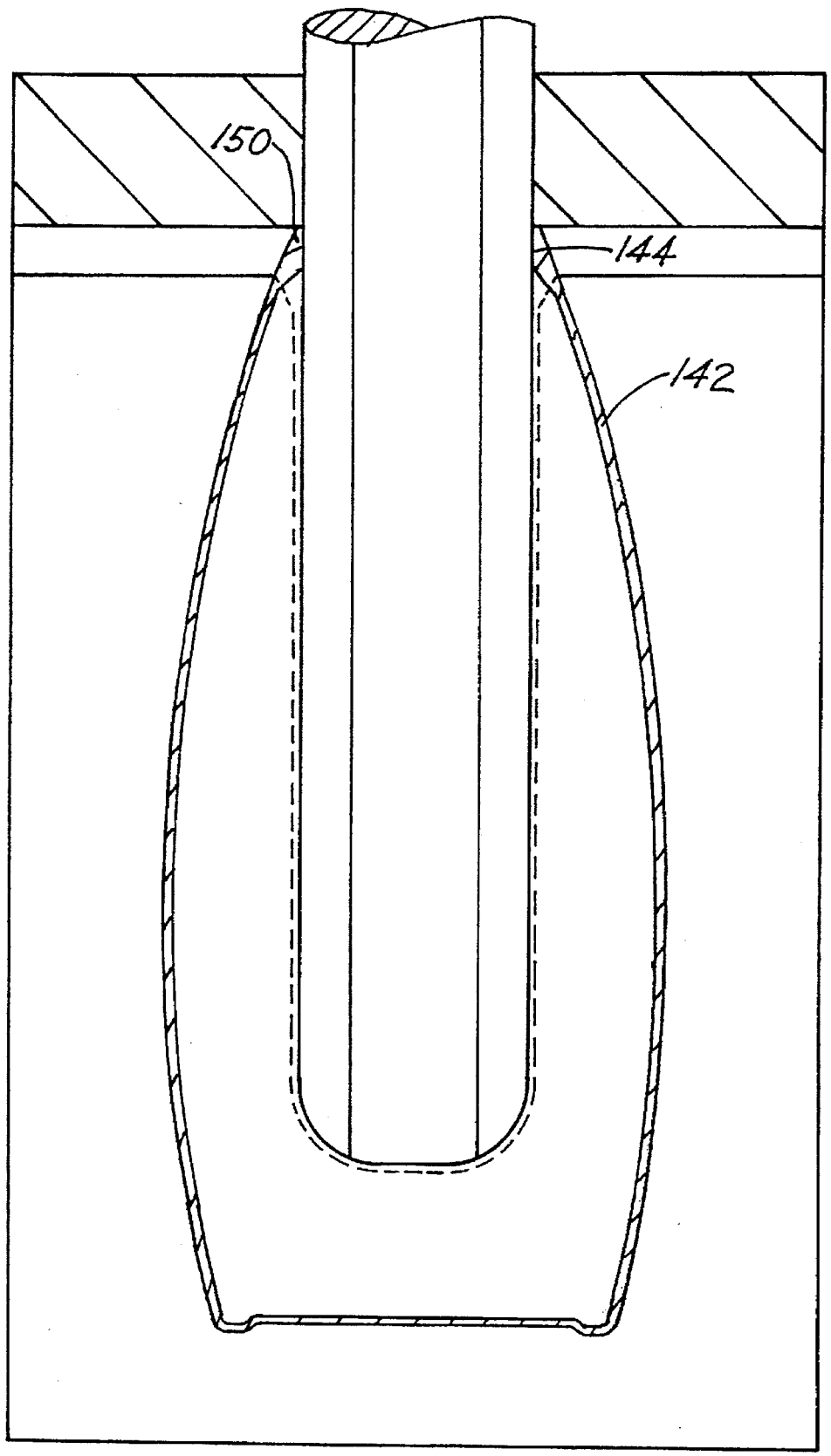
FIG. 35 is a diagrammatic front elevation view, in section, of the tooling used in the second stage of manufacture of the smooth shaped integrally molded plastic restricted neck container shown in FIG. 33.
Figure 36:
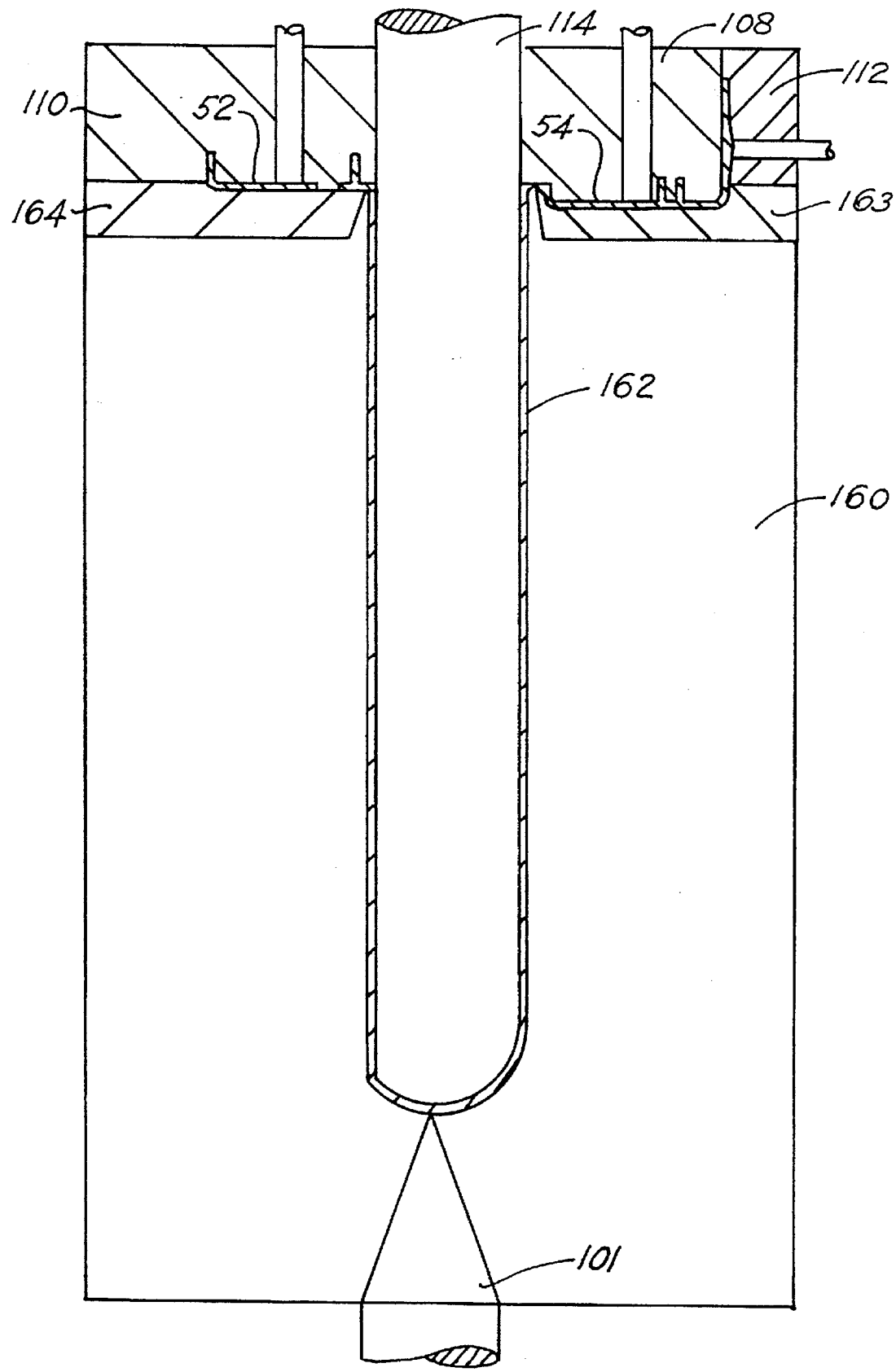
FIG. 36 is a diagrammatic side elevation view, in section, of tooling used in the first stage of manufacture of an integrally molded plastic restricted neck container with the apex of the cavities forming at hinge points according to another embodiment of the invention.

Referring to FIGS. 33–35, there is shown tooling 140 for the formation of a smooth shaped restricted necked integrally molded plastic bottle or container 142 (FIG. 35) with an elliptical shaped top 144, having the same integral features, including the orifice cap 52 and the sealing cap 54 as the container 50 shown in FIGS. 11–22. Referring to FIG. 33, the tooling 140 is illustrated, diagrammatically, in sectional side elevation, for the formation of an integrally molded preform or parison 146 with a bulge 148 near the neck or opening 150 of the container body, except in the flat finger access area 59 (FIG. 34). Referring to FIG. 34, when the preform 142 is blown, a flat sealing area 154 is formed for the orifice cap 52 and a sealing area is provided between the core rod 114 and the neck of the container for containing the compressed air within the preform during the blow operation. A tab 157 is located at the rear of the orifice cap 52 to aid in reopening of the orifice cap 52 to allow refilling of the container. A complementary recess (not shown) is provided in the sealing cap 54 for receiving the tab 157. The formed, smooth shaped container 142 is shown in a front sectional view in FIG. 35.

Figure 38:
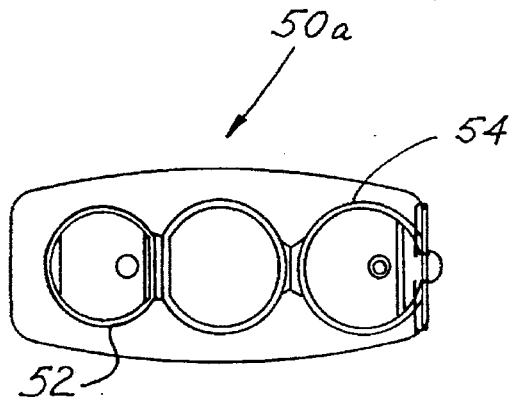
FIG. 38 is a top plan view of an integrally molded container having in-line orifice and sealing caps.
Figure 39:
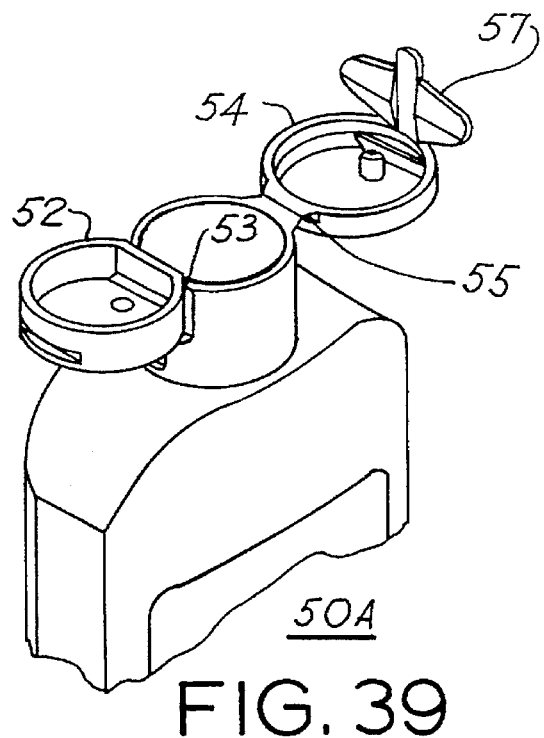
FIG. 39 is a fragmentary perspective view of the neck and closure of the container of FIG. 38.
Figure 40:
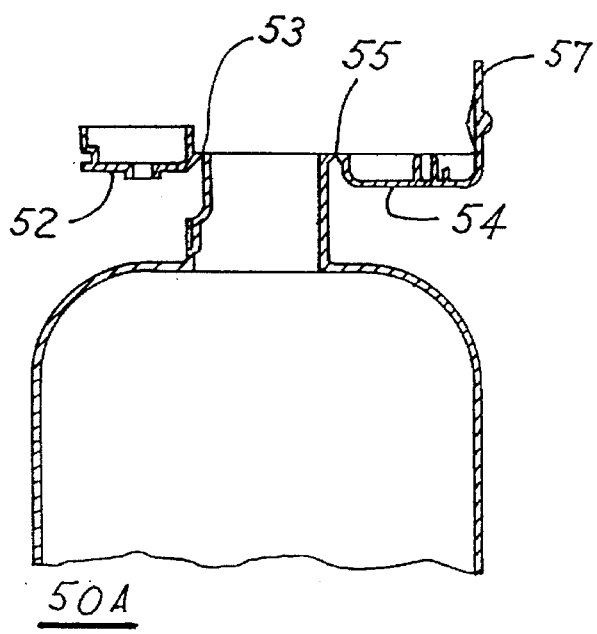
FIG. 40 is a side elevation section view of the container of FIG. 38 shown in the open molded condition.
Figure 41:
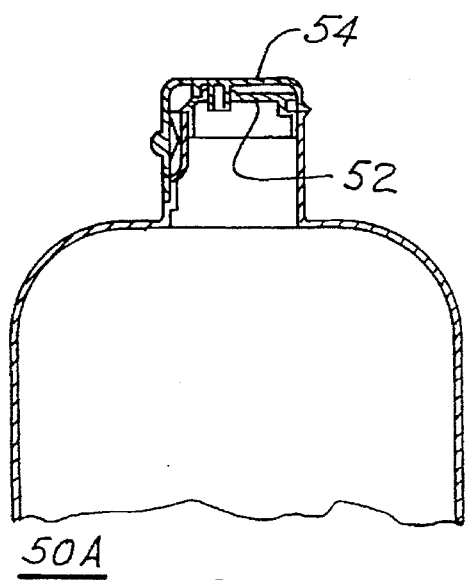
FIG. 41 is a view similar to FIG. 40 with the container shown in the closed condition.

Referring to FIG. 38, the preform cavity mold need not be a split mold, but can be a one piece mold 160 for producing the container body portion of a preform 162 with integral orifice and sealing caps, eliminating the split 130 (FIG. 29) between the lower cap cavity mold tools 106 and 107 and the preform cavity mold defining tools 104 and 105. This avoids the horizontal mold line round the neck of the finished container. The lower apex right hand cap cavity 163 and the lower apex left hand cap cavity 164 of the tooling that form the integral orifice and sealing caps are the similar as for the tooling 100 (FIG. 29). Rotating the sealing caps closed is achieved by a pivot mechanism in the split bottle cavity. Alternatively, the split bottom preform cavities and bottle cavities can form an apex at the orifice and sealing cap hinge points. This arrangement requires that the split run the opposite way, but no horizontal mold line is formed at the neck of the container.

Figure 37:
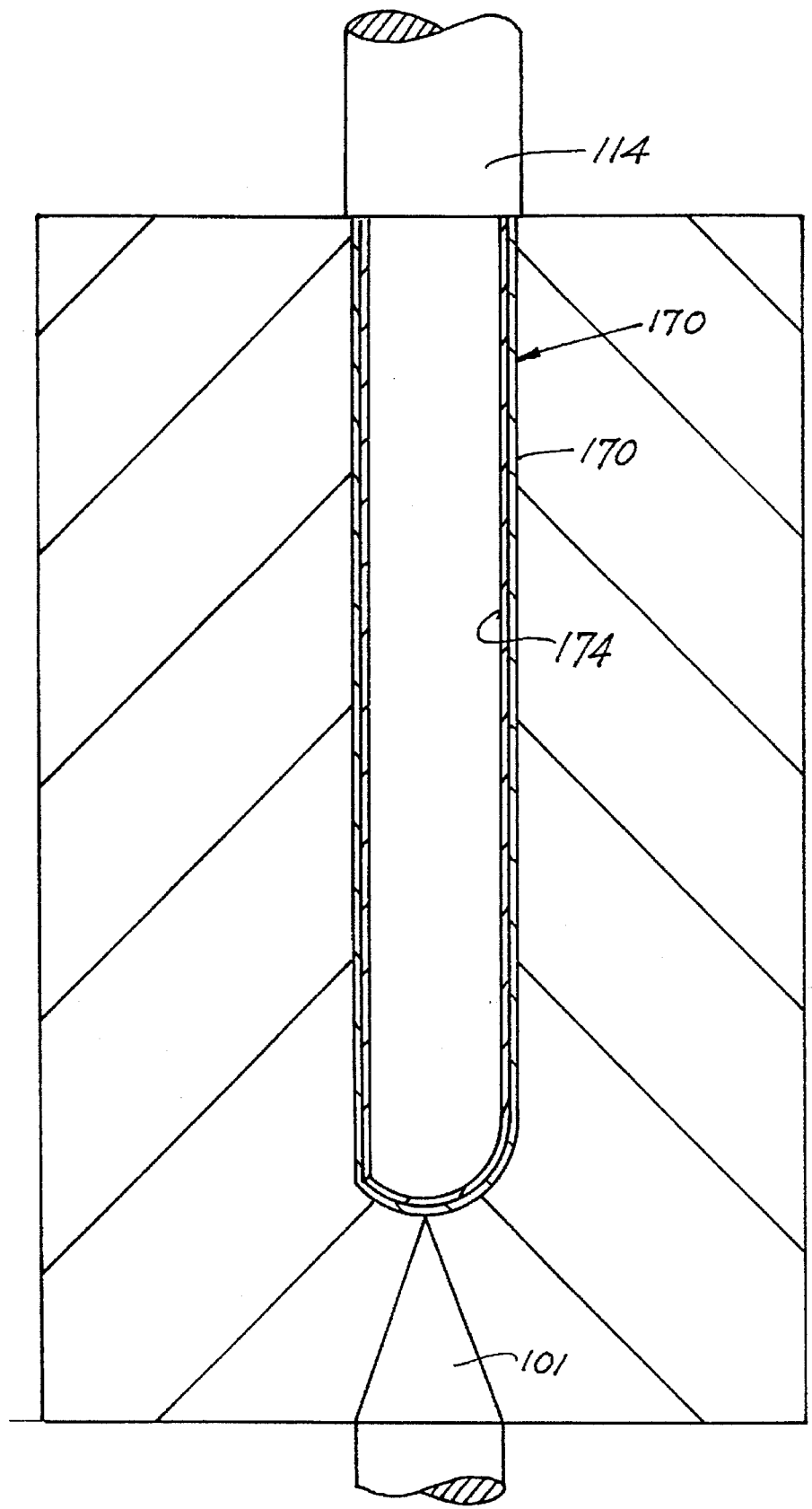
FIG. 37 is a diagrammatic side elevation view, in section, of tooling used in the manufacture of the intermediate layer of a triple walled blow molded container in accordance with a further embodiment of the invention.

Referring to FIG. 37, there is illustrated a preform 170 for use in producing a container, wherein the preform is formed with a multi-layered wall including an outer base layer 172 and an intermediate layer 174. Multi-layer wall containers, such as twin and triple layered wall containers, are produced for two reasons. The first reason is the added barrier properties which different layered plastic offer. The second reason is that recycled plastic is sandwiched between virgin material. The forming of the intermediate layer 174 (or intermediate preform) over the base layer (or base preform) is carried out prior to the molding of the third final layer (not shown) in forming the integral preform. The tooling for the first two stages of the process which produces the base and intermediate layers or preforms necessitates different lower sets of preform cavity molds. Alternatively, the base and intermediate preforms can be vacuum formed and assembled in the cavity prior to the molding of the preform.

Figure 47:
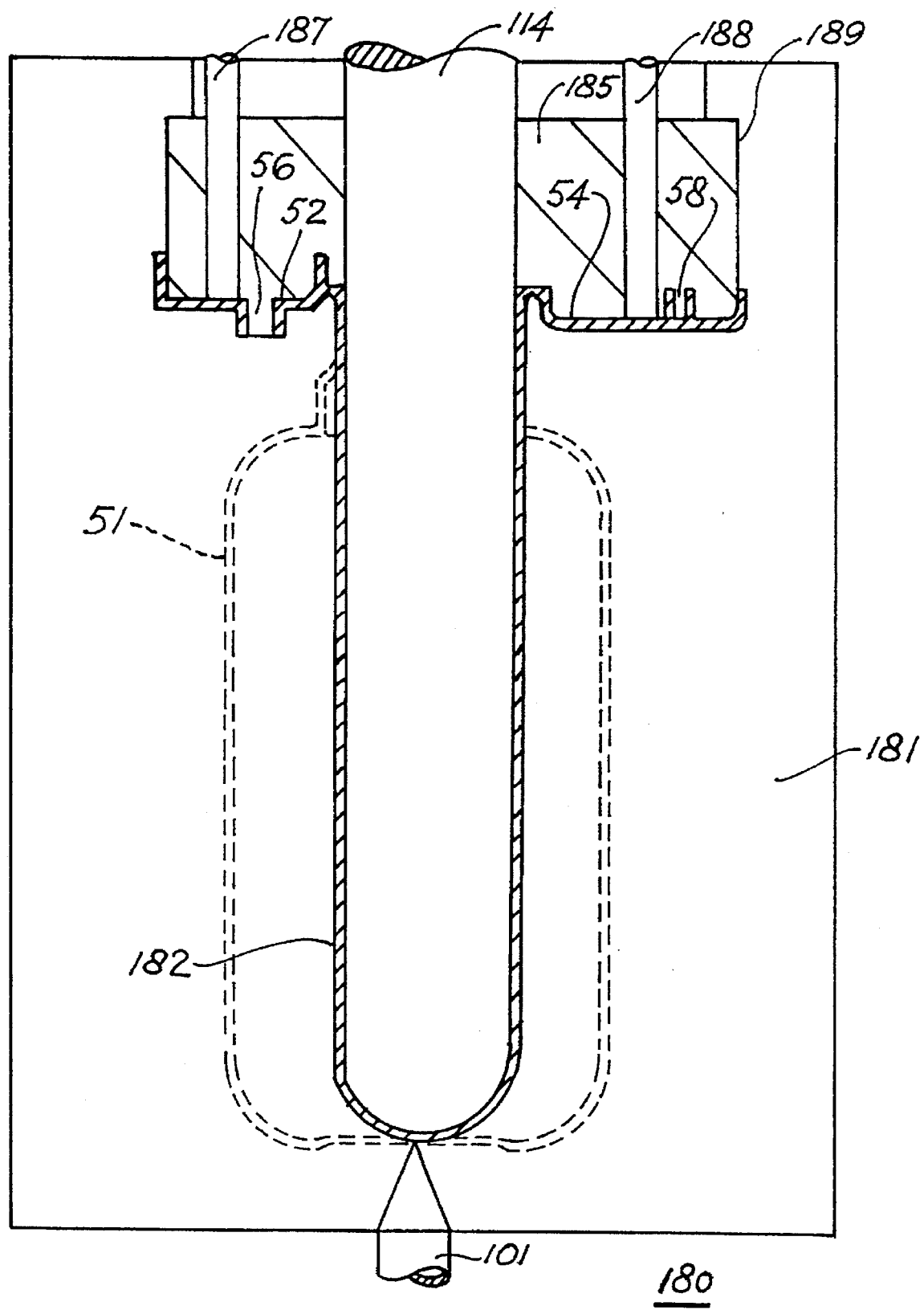
FIG. 47 is a diagrammatic, top plan view of a portion of horizontally oriented tooling for producing a container by an injection blow molding process.

FIG. 47 is a top plan view of a portion of horizontally oriented tooling 180 illustrating the lower preform cavity tool 181, the upper preform cavity being removed, for producing a container by an injection blow molding process. The container is similar to container 50, shown in FIG. 11, but is circular in shape and does not show the tamper indicating assembly. Referring to FIG. 47, the tooling 180 illustrated is that for the first stage of the production cycle that provides for the injection molding through the injection nozzle 101 of an integrally molded preform or parison 182 from which the body, shown by the dashed lines, of the finished container is blown, the parison 182 including an integrally molded orifice cap 52 and sealing cap 54 similar to like numbered elements for the embodiment illustrated in FIG. 11. The tooling 180 includes the lower preform cavity tool 181, an upper preform cavity tool (not shown) which is the mirror image of tool 181, and a cap cavity defining tool 185. The cap cavity defining tool defines the cavities for producing the inner surfaces of the orifice cap 52 and of the sealing cap 54, including the orifice 56 and the boss 58, the outer surfaces being defined by the upper and lower preform cavity tools. A core rod 114, which is the core for the preform, acts as the passageway for the flow of air. The tooling 180 further includes an orifice cap ejection pin 187 and a sealing cap ejection pin 188.

The cap cavity defining tool 185 is carried by the core rod 114 and is aligned into the upper and lower preform cavity tools by way of location surfaces 189 on the preform cavity tools and mating surfaces on the cap cavity defining tool. The shape of the preform 182, in cross section is not fully circular. Rather, the preform has a flat that runs its entire length so as to provide the flat surface that will define the finger access area of the finished container in the manner of container 50 shown in FIG. 11.

Figure 48:
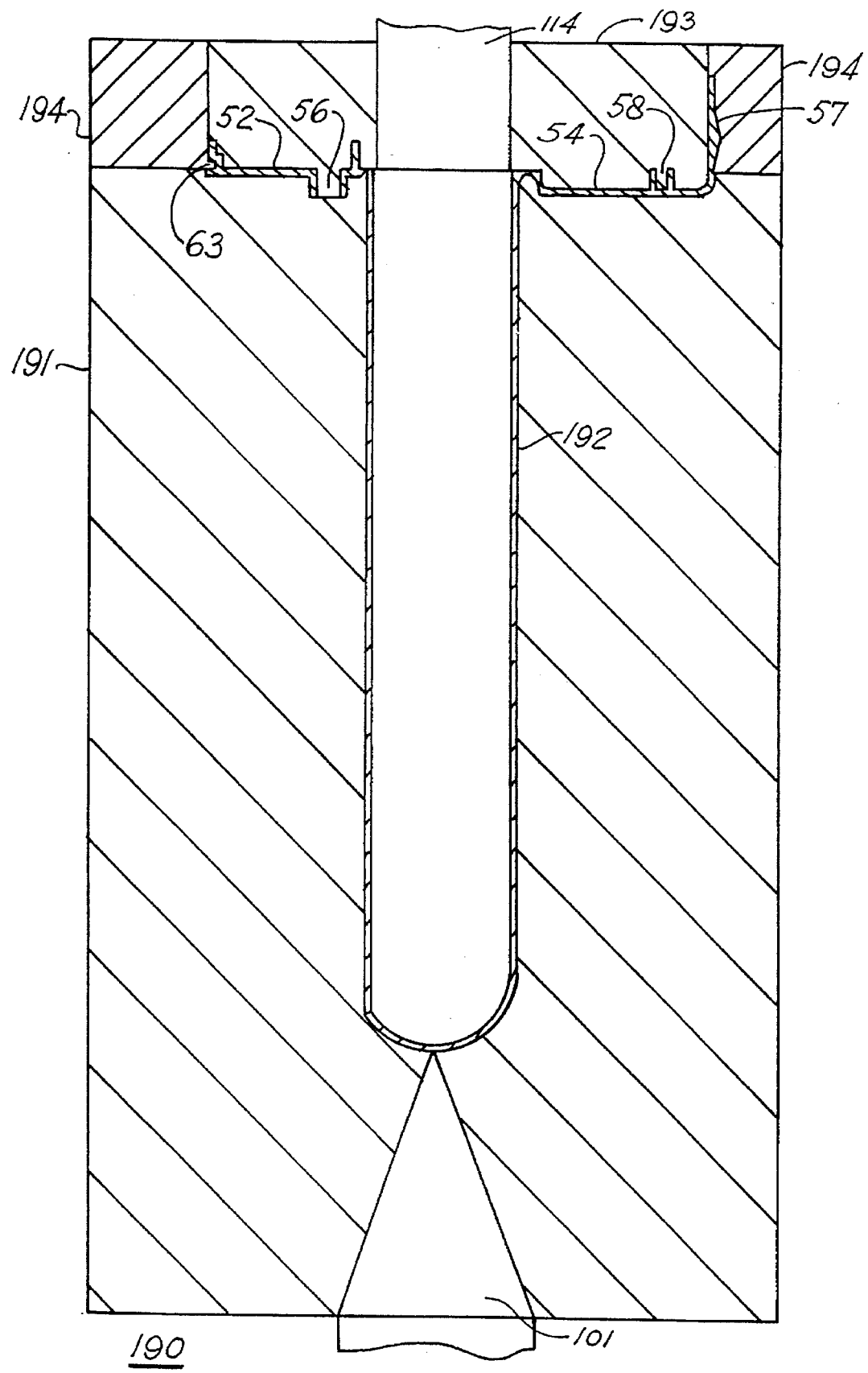
FIG. 48 a diagrammatic, side section view of injection mold stage tooling including a one-piece preform cavity and having an upper cap cavity carried by the blow rod; and, FIG. 49 a diagrammatic, side section view of a blow mold stage tooling including having an upper cap cavity carried by the blow rod.

Referring to FIG. 48, there is shown injection mold stage tooling 190 including a one-piece preform cavity 191 for producing a preform 192 including an integrally molded orifice cap 52 and an integrally molded sealing cap 54. The tooling includes an upper cap cavity 193 for forming the inner surface of the orifice and sealing caps and outer core 194 for forming the recess 63 and the tear tab assembly 57. The outer core 194 locates the recess 63 on the orifice cap in a position above or at least partially above the container neck to provide access to the slot when the orifice cap is closed. The upper cap cavity 193 is carried by the blow rod 114. This tooling layout requires removal of the preform 192 and the upper cap cavity 193 in a direction in line with the axis of the core rod for transferring the preform to the blow mold stage tooling 195 which is shown in FIG. 49.

Figure 49:
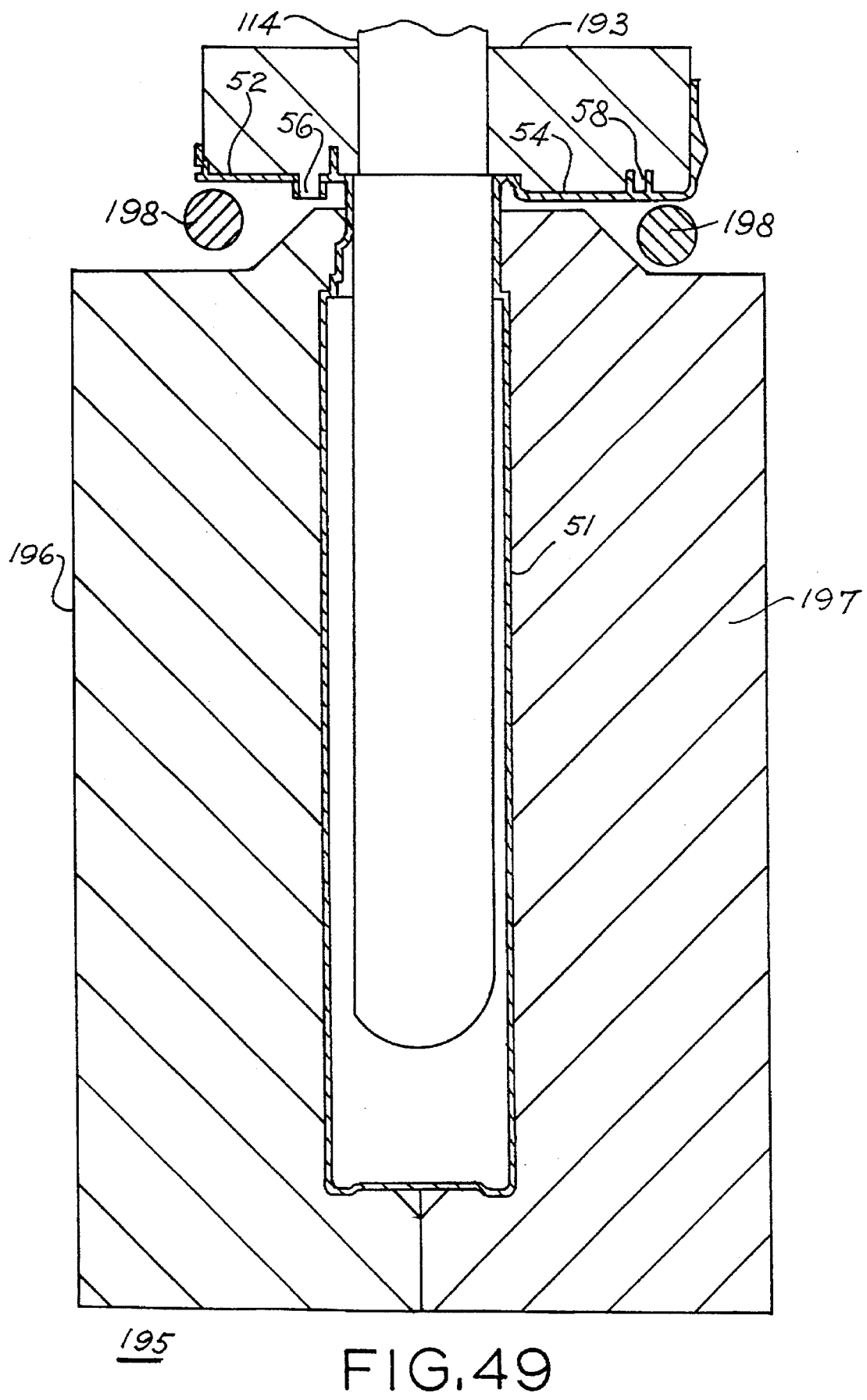

Referring to FIG. 49, there is shown a Gussoni type blow mold stage tooling 195 for defining a split bottle cavities 196 and 197 for blowing the preform 193 carried on the blow rod 114 along with the upper cap cavity 193. Cap rotating bars 198 are provided to rotate the caps 52 and 54 towards the closed positions after the container body 51 has been blown to its final shape.

Although the integrally molded container provided by the present invention is described as being produced by an injection blow molding process, other methods of manufacture are possible, such as injection stretch blow molding, or injection molding which is particularly suited for applications where the container body does not have a restricted neck area. These tooling layouts can be used horizontally oriented, Gussoni type molding type machines and can also be used in a vertical orientation. Other methods or adaptations of machine layout which can be used to manufacture the integral container include the Piotrowsk, Moslo and Farkus methods or adaptations. The plastic injection point at the bottom of the preform or parison need not be the only injection point. Other points may be located on the inner and/or the outer caps. The containers can be any practical shape and size and need not be for example rectilinear or curvelinear. The embodiments may contain any substance. No restrictions are claimed on size, shape, use, contents, number of compartments or manufacturing method. The concepts discussed can be applied to other non integral containers. The features of one design can also be applied other designs and visa versa. Any feature or combination of features from any of the embodiments where applicable can be used to form any non specifically described container. The invention has been described by way of example only and it should be understood that modifications and improvements may be made to the invention without departing from the scope of the descriptions and drawings.

I claim:

1. An integrally molded plastic container for containing a flowable substance to be dispensed, said container comprising: a container body blow molded to form a container neck portion and a shoulder portion interconnecting said container neck portion and said container body, said container neck portion defining an opening to the interior of the container and having a cross-sectional area that is substantially smaller than the cross-sectional area of said container body, and closure means including an orifice cap having an orifice, said orifice cap being flexibly hinged to said container neck portion adjacent to said container opening for pivoting movement from an open position to a closed position where said orifice cap closes said container opening, a sealing cap flexibly hinged to said container neck portion adjacent to said container opening for pivoting movement relative to said orifice cap between a closed position where said sealing cap is located in sealing relation with said orifice and an open position where said sealing cap is out of sealing relation with said orifice permitting the substance to flow out of the container through said orifice, said sealing cap having a fixed edge portion hinged to said container neck portion at a first side of said container neck portion and a free edge portion opposite to said fixed edge portion, said orifice cap having a fixed edge portion hinged to said container neck portion at a second side of said container neck portion which is opposite to said first side, said fixed edge portion of said orifice cap being located within the confines of said sealing cap and spaced inwardly of said free edge portion of said sealing cap when said sealing cap is in said closed position.

2. The integrally molded container according to claim 1, wherein said container neck portion has a generally flat finger access area at a side opposite to said first side to provide finger access to the bottom surface of said free edge portion of said sealing cap to aid in moving said cap from said closed position to said open position, said finger access area defining a substantially straight edge portion for the periphery of said container neck portion at said opposite side, a hinge connecting said a fixed edge portion of said orifice cap to said container neck portion at said straight edge portion thereof, said sealing cap including a top which overlies said orifice cap when said sealing cap is in said closed position and a sidewall at least a portion of which is positioned adjacent to and spaced outwardly from said straight edge portion on the periphery of said container neck when said sealing cap is in said closed position, said hinge being located inboard of the sidewall of said sealing cap at the free end thereof and within the confines of said sealing cap when said sealing cap is in said closed position.

3. The integrally molded container according to claim 2, wherein said orifice cap includes a notch at a location opposite said fixed edge portion thereof, said notch being disposed on said fixed edge portion of said orifice cap so as to be located above the container neck portion when said orifice cap is in said closed position, defining a gripping location to facilitate the reopening of said orifice cap for refilling of the container.

4. The integrally molded container according to claim 2, wherein said closure means includes tamper indicating means molded integrally therewith, said tamper indicating means having a securing end portion adapted to be permanently secured to the container neck portion after the container has been filled and closed to thereby secure said sealing cap to said container neck portion.

5. The integrally molded container according to claim 4, wherein said tamper indicating means is molded integrally with said sealing cap and includes severable tear tab means interposed between said sealing cap and said securing end portion and adapted to be severed therefrom, thereby disconnecting said sealing cap from said securing end portion to permit said sealing cap to be moved to the open position.

6. The integrally molded container according to claim 4, wherein said tamper indicating means at least partially encloses said finger access area to prevent access thereto.

7. The integrally molded container according to claim 1, wherein said orifice cap and said sealing cap are hinged to said container neck portion at different height orientations.

8. The integrally molded container according to claim 1, wherein said container body is generally rectangular or oval in cross section, said sealing cap and said orifice cap being hinged to said container neck portion at opposite sides thereof and extending in line with one another and in overlying relation with said shoulder portion of said container when said sealing cap and said orifice cap are both in said open position.

9. An integrally molded plastic container for containing a substance to be dispensed, said container comprising: a body portion having an opening to the interior of the container, closure means for closing said container opening, said closure means including an orifice cap having an orifice, and a sealing cap having a top and a sidewall, a first hinge connecting said orifice cap to said container body portion adjacent to said container opening at a first location along the periphery of said container opening for pivoting movement between an open position and a closed position in which said orifice cap closes said container opening so that said substance can be dispensed only through said orifice, a second hinge connecting said sealing cap to said container body portion adjacent to said container opening at a second location along the periphery of said container opening for pivoting movement between an open position and a closed position in which said top of said sealing cap overlies said orifice cap with a portion of said sidewall of said sealing cap positioned adjacent to and spaced outwardly from said first location along the periphery of said container opening, whereby said first hinge is located within the confines of said sealing cap and spaced inwardly from said portion of said sidewall of said sealing cap when said sealing cap is in said closed position, said sealing cap including means for sealing said orifice only when said sealing cap is in said closed position.

10. The integrally molded container according to claim 9, wherein said container body portion includes a generally flat finger access area at said first location, said finger access area defining a substantially straight edge portion for the periphery of said container opening at said first location, and the remaining portion of the periphery of said container opening being generally annular in shape whereby the periphery of said container opening has a generally "D" shape configuration, said first hinge being connected to said container body portion at said straight edge portion and overlying said flat finger access area, providing access to the bottom surface portion of said sealing cap near the peripheral edge thereof to aid in moving said sealing cap from said closed position to said open position, and wherein the shape of said orifice cap conforms to the "D" shape of said container opening.

11. The integrally molded container according to claim 10, wherein said sealing cap is hinged to said container neck portion at a location diametrically opposed to said first location.

12. The integrally molded container according to claim 10, including tamper indicating means formed integrally with said closing portion, said tamper indicating means including a securing end portion adapted to be secured to the container body portion after said container has been filled and closed to thereby secure said closing portion to said container body portion, and tear tab means including at least one tear tab interposed between said closing portion and said securing end portion and adapted to be severed therefrom, thereby disconnecting said closing portion from said securing end portion to permit said container to be opened.

13. The integrally molded container according to claim 12, wherein said tamper indicating means is molded integrally with said sealing cap.

14. The integrally molded container according to claim 12, wherein said tamper indicting means includes a boss defining a pivot for said tear tab means.

15. The integrally molded container according to claim 12, wherein said tamper indicating means includes at least one tear point defining a weakened portion for said tear tab means.

16. A parison for use in blow molding to produce an integrally molded plastic container having a blow molded container body with a restricted neck portion defining an opening to the interior of the container body, and a closure portion for closing said opening, said parison comprising: a first portion adapted to be expanded by a blow molding process to form the container body and the restricted neck portion therefor, and a second portion defining said closure portion, including an orifice cap that is integrally molded with said neck portion at a first location along the periphery of said opening and a sealing cap that is molded integrally with said neck portion at a second location along the periphery of said opening that is spaced at least 90° from said first location.

17. The method of producing an integrally molded container having a container body and including a neck portion that defines an opening to the interior of the container body, and a closure portion for sealing said opening, said method comprising the steps of: injection molding a parison in a first mold assembly to form a container body portion, said neck portion and said closure portion, with said closure portion including an orifice cap that is molded integrally with said neck portion at a first location along the periphery of said opening and a sealing cap that is molded integrally with said neck portion at a second location along the periphery of said opening that is spaced at least 90° from said first location, and expanding the container body of said parison in a second mold assembly using a blow molding apparatus in a blow molding operation to produce the completed container.

18. The method according to claim 17, including the steps of transferring said parison and the portion of said first mold assembly in which said closure portion is formed from an injection mold station to a blow station.

19. The method according to claim 17, wherein said container body includes a restricted neck portion which defines an opening to the interior of the container, and wherein said restricted neck portion is produced by extrusion blow molding.

20. The method according to claim 17, including the steps of transferring said parison and the portion of said first mold assembly in which said closure portion is formed from an injection mold station to a blow station.

21. The method according to claim 17, wherein said neck portion defines a restricted neck for said container which defines said opening to the interior of the container body, and including maintaining said neck portion in a portion of said first mold assembly during said blow molding operation whereby said restricted neck is produced in said blow molding operation.

22. The method according to claim 17, including producing said container body and neck portion by extrusion blow molding.

* * * * *